United States Patent [19]
Oka et al.

[11] Patent Number: 6,044,769
[45] Date of Patent: Apr. 4, 2000

[54] IN-PIPE WORK APPARATUS

[75] Inventors: Kiyoshi Oka, Mito; Eisuke Tada, Hitachinaka; Tadashi Ogawa, Yokohama; Kouichi Tuji, Machida; Yuuji Takiguchi, Ibaraki-ken; Seiichiro Kimura, Inagi; Akiko Sakurai, Yokohama; Nami Sasaki, Tsurugashima; Yasunori Ozaki, Yokohama; Tetsuro Nishimura, Machida, all of Japan

[73] Assignees: Kabushiki Kaisha Toshiba, Kawasaki; Japan Atomic Energy Research Institute, Tokyo, both of Japan

[21] Appl. No.: 08/937,768

[22] Filed: Sep. 25, 1997

[30] Foreign Application Priority Data

Sep. 27, 1996 [JP] Japan .................................. 8-256732
Sep. 30, 1996 [JP] Japan .................................. 8-259594

[51] Int. Cl.⁷ .................................................. B61B 13/00
[52] U.S. Cl. ........................................................ 104/138.2
[58] Field of Search ........................ 104/138.2; 346/33 P; 378/60; 73/866.5, 865.8; 33/544, 777

[56] References Cited

U.S. PATENT DOCUMENTS

| | | | |
|---|---|---|---|
| 2,518,330 | 8/1950 | Jasper et al. | 104/138.2 |
| 4,919,223 | 4/1990 | Egger et al. | 104/138.2 |
| 5,018,451 | 5/1991 | Hapstack | 104/138.2 |
| 5,080,020 | 1/1992 | Negishi | 104/138.2 |
| 5,121,694 | 6/1992 | Zollinger | 104/138.2 |
| 5,293,823 | 3/1994 | Box . | |
| 5,601,025 | 2/1997 | Box | 104/138.2 |
| 5,791,255 | 8/1998 | Box | 104/138.2 |

FOREIGN PATENT DOCUMENTS

| | | |
|---|---|---|
| 2 647 527 | 11/1990 | France . |
| 4-102686 | 9/1992 | Japan . |
| 2 000 301 | 1/1979 | United Kingdom . |

*Primary Examiner*—Mark T. Le
*Attorney, Agent, or Firm*—Oblon, Spivak, McClelland, Maier & Neustadt, P.C.

[57] ABSTRACT

An in-pipe work device comprising at least two movement mechanisms connected with each other in a longitudinal direction of a pipe by a flexible tube, and a control device for controlling the movement mechanisms, the movement mechanisms including a body connected to the flexible tube, a guide member installed on the body such that the guide member is slidable in an axial direction, a support leg drive mechanism provided on the guide member and having a support leg movable in a radial direction of the pipe, for pressing the support leg against an inner wall of the pipe, thereby to hold the guide member kept unmovable in an axis direction of the pipe, a slide mechanism for relatively sliding the guide member and the body, with the support leg pressed against the inner wall of the pipe, thereby to slide the body in the axis direction of the pipe, wherein the control device controls the in-pipe movement device so as to move in a pipe by itself, by sequentially operating the plurality of movement mechanism in a predetermined order.

5 Claims, 22 Drawing Sheets

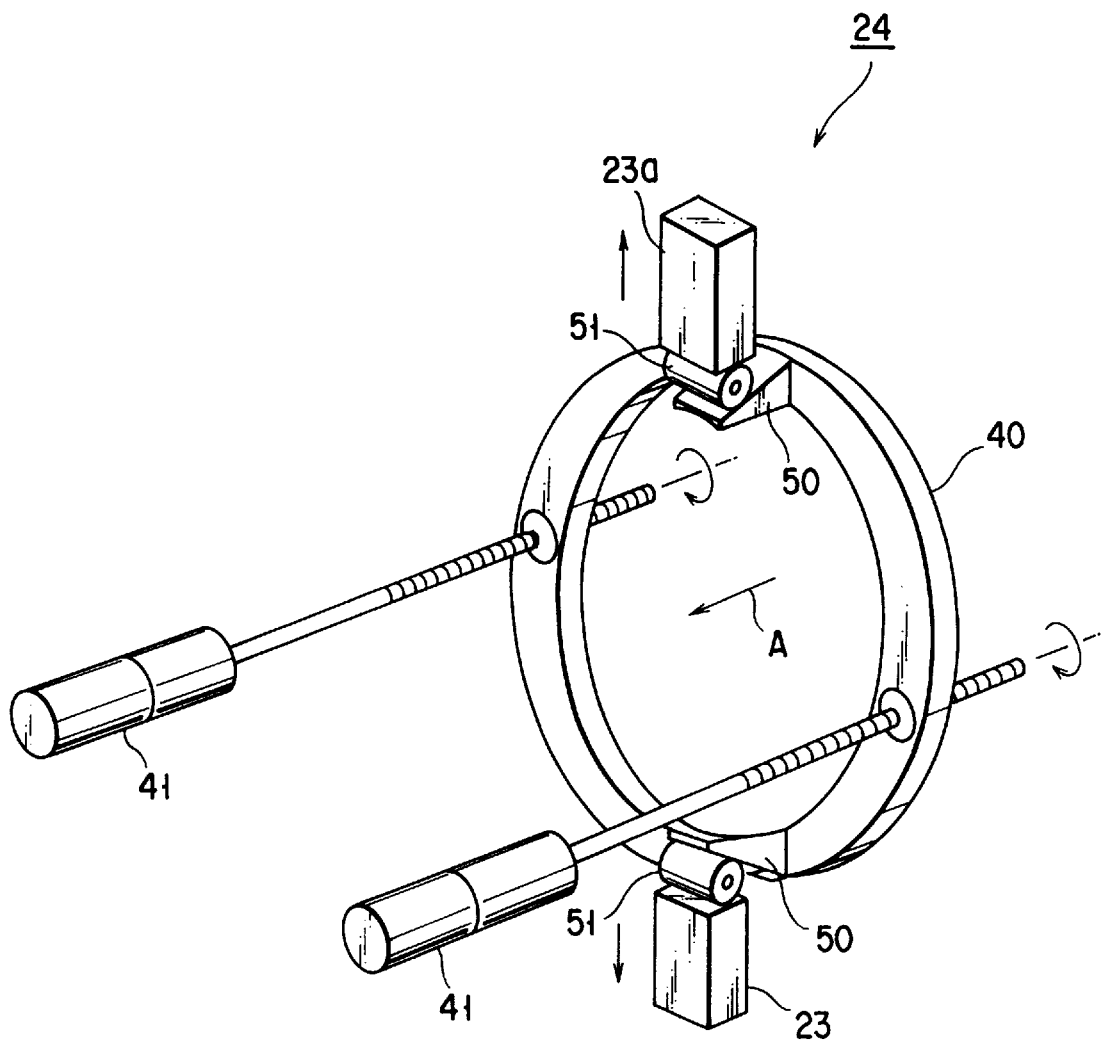
F I G. 4

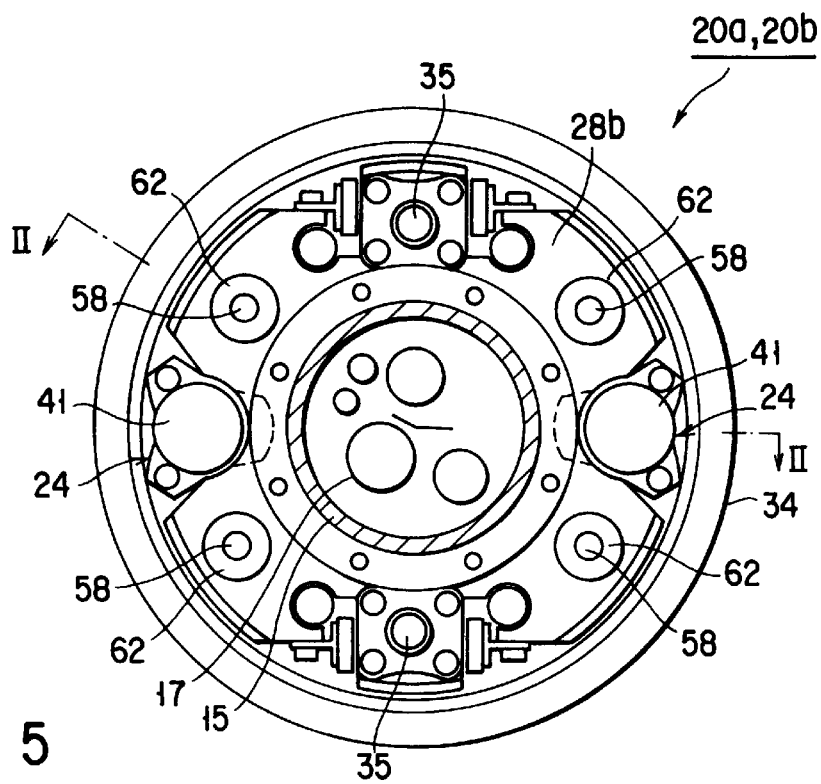
F I G. 5
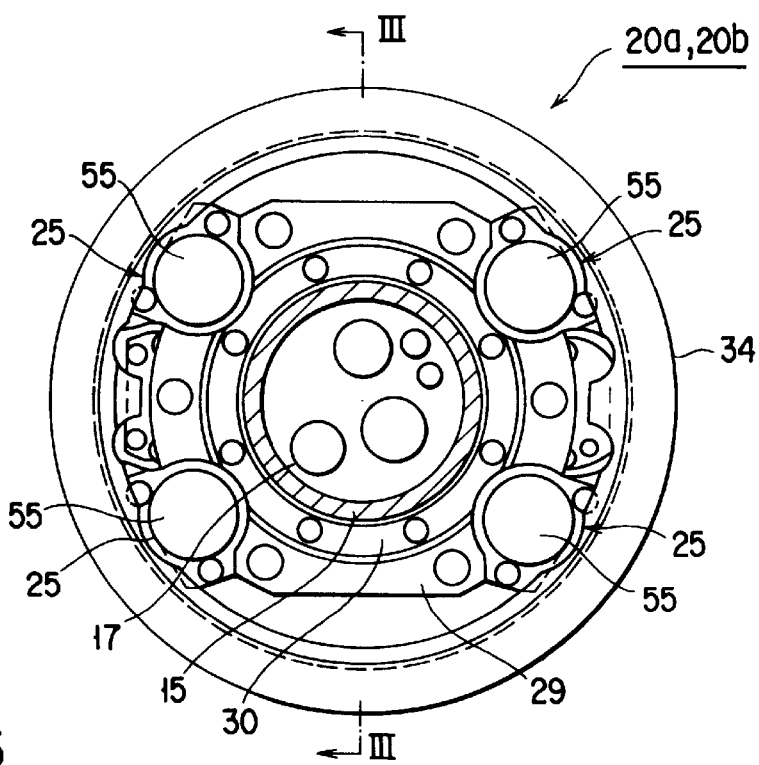
F I G. 6

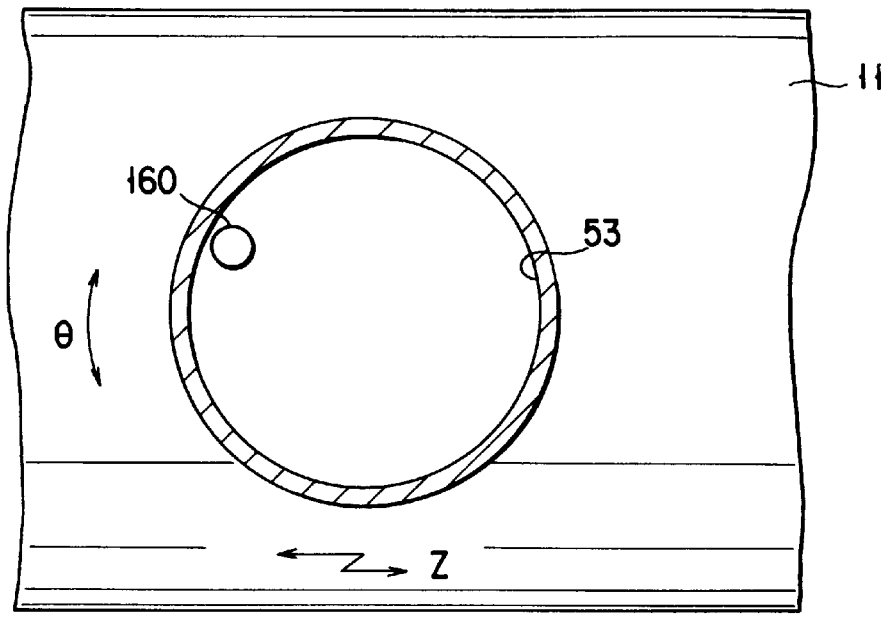
F I G. 17
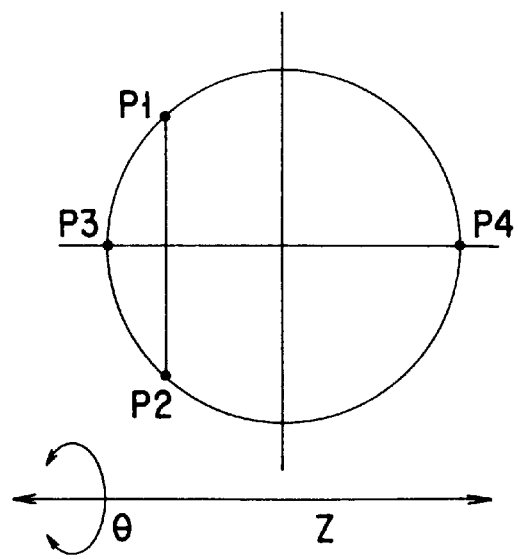
F I G. 18

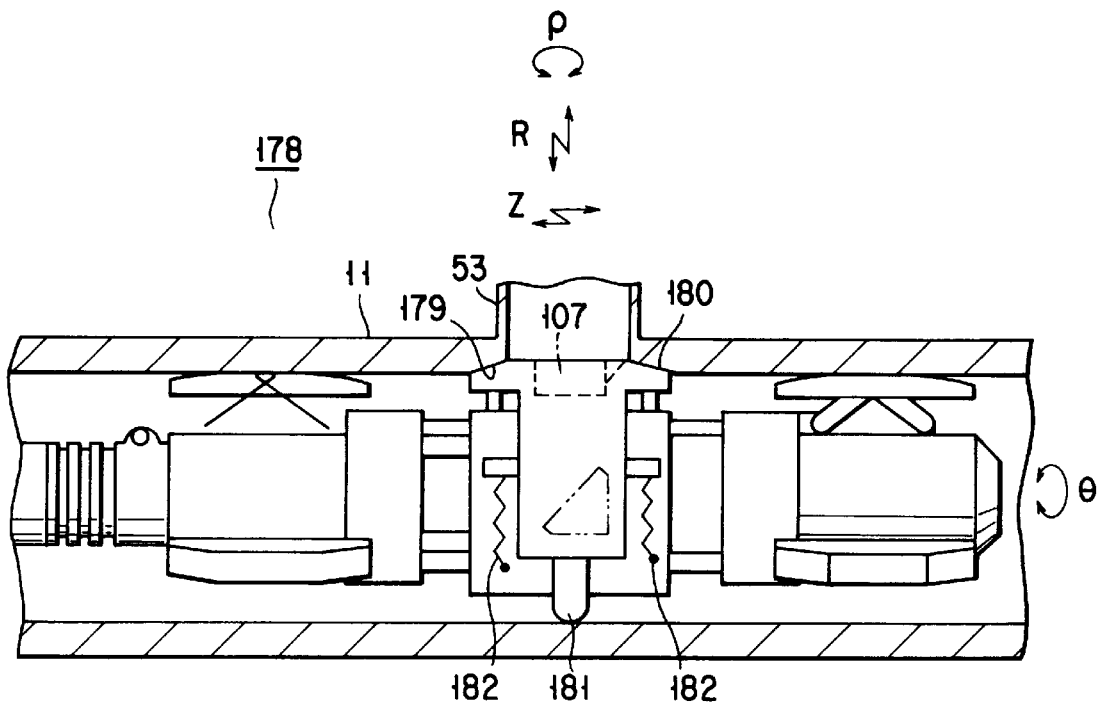
F I G. 24
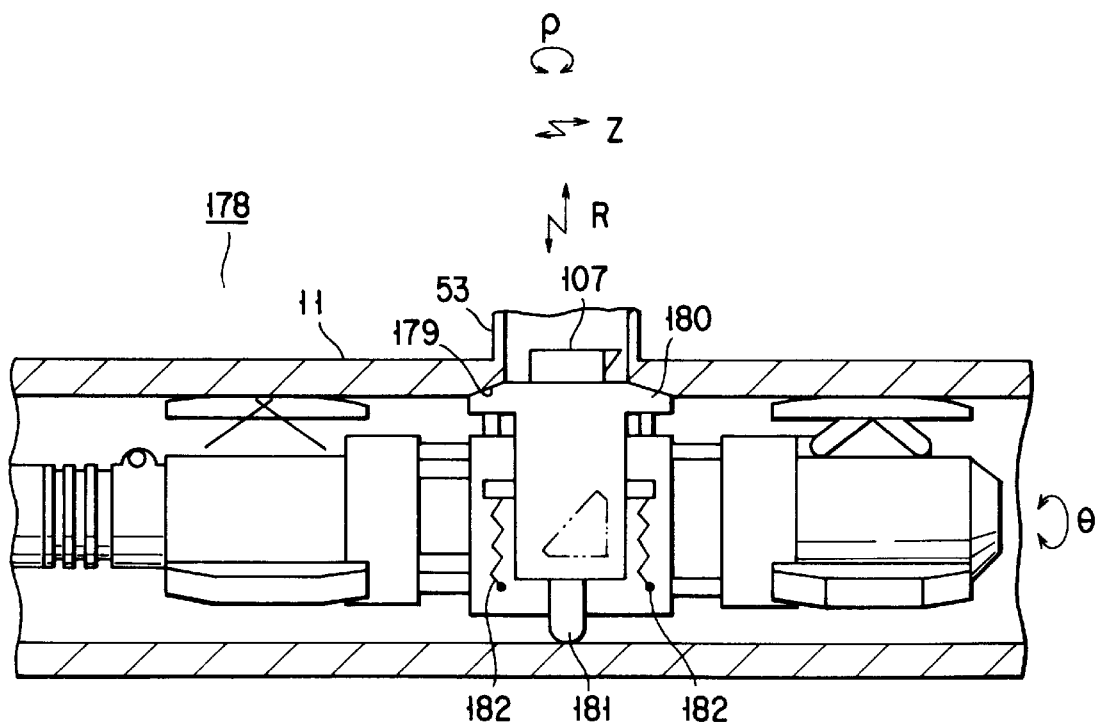
F I G. 25

IN-PIPE WORK APPARATUS

BACKGROUND OF THE INVENTION

The present invention relates to an in-pipe work apparatus which moves inside a pipe by itself and carries out an inspection of the pipe or jobs such as welding-cutting, and repairing.

An in-pipe work apparatus is used for works in a pipe in an atomic power plant, a chemical plant, and the like and in other general industrial fields. This kind of in-pipe work apparatus is applied to a wide range including an inspection on inner walls of a pipe, cleaning (such as removal of foreign matters) thereof, welding and cutting, an inspection on a welded portion, and the like. The kinds of pipes which can be dealt with by this apparatus range variously. Due to limitations from diameters of pipe, the structure of an in-pipe work apparatus is arranged so as to integrate a movement device and a work device together, in some cases, or is arrange such that both devices are separated from each other.

A pipe as a work target to be dealt with normally has a pipe length which is several hundreds times longer than the inner diameter of the pipe itself, and includes a bending portion or a branch portion. Therefore, it is necessary for an in-pipe work apparatus moving in a pipe to be capable of responding to various moving patterns including forward and backward movements, lateral movements in left and right directions, vertical movements in the upward and downward directions, and the like.

In addition, an in-pipe work apparatus is connected to an external control apparatus outside the pipe, by cables and hoses. Examples of the cables and hoses connected to the control apparatus are metal cables or optical fiber cables. A metal cable, a hydraulic hose, or the like is used for power transmission. Such a cable or hose includes a number of cores. Since these cables and hoses a tension load when moving, in many cases, cables and hoses are used in form of a composite cable added with a tension member (or a tension cable) in view of conveniences of handling inside and outside a pipe.

However, if cables and hoses are shaped into one composite cable, the outer size, weight, and tolerable bending diameter are enlarged, and the bending reaction force is accordingly increased greatly. Therefore, there is a risk that a composite cable cannot be smoothly guided into a pipe or a composite cable is difficult to be wound up by a cable winding apparatus.

Although an in-pipe work apparatus comprises a movement device which makes the apparatus run in a pipe, this movement device must generate a tractive force large enough to smoothly move various component devices and the work apparatus with the composite cable connected thereto. Mechanisms of a wheel type, a crawler type, a spiral type, a spanworm type, and the like have been designed and are being put into practical use.

Further, since an in-pipe work apparatus moves with a composite cable drawing together in a pipe, a friction resistance is generated between the inner wall of the pipe and the composite cable. In addition, a loss of a tension force is caused at a curved pipe portion of the pipe since the direction of the tension changes at this curved pipe portion, so that the friction resistance is increased. When a pipe as a target to be dealt with has a long pipe path and includes a number of curved portions, the tractive force required for the movement device is extremely large. Therefore, how the friction between the inner wall and the composite cable can be reduced is a significant problem to smoothly accomplish moving and works inside a pipe.

In addition, since the in-pipe work apparatus must moves inside a pipe, the shape of the in-pipe work apparatus naturally depends on the pipe diameter of a pipe as a target to be dealt with and shapes of curved portions thereof. If the pipe diameter and the curvatures of bending portions are small, the effective cross-section area is small so that the movement device and the work apparatus must shaped to be narrow and long.

Thus, there has been a demand for a movement device which is capable of accurately detecting the moving position of itself and securely moving in a pipe under conditions as described above.

BRIEF SUMMARY OF THE INVENTION

The present invention has been made in consideration of the situation as described above, and has an object of providing an in-pipe work apparatus which is small and compact and can smoothly move securely by itself in a pipe.

The present invention has another object of providing an in-pipe work apparatus which can perform a large tractive force and can smoothly move in a pipe when the pipe diameter and the curvature radius are small.

The present invention has another object of providing an in-pipe work apparatus in which friction generated between an inner wall of a pipe and control cables are reduced.

Further, the present invention has a another object of providing an in-pipe work apparatus in which a work device can be accurately set at a work position in a pipe.

In addition, the present invention has another object of providing an in-pipe work apparatus which can move in a pipe and can be stopped and positioned accurately at an installation portion of a T-shaped branch pipe, and which can weld or cut a portion of the branch pipe from inside of the pipe.

In order to achieve the above objects, according to a first aspect of the present invention, there is provided an in-pipe work apparatus comprising: at least two movement mechanisms connected with each other in a longitudinal direction of a pipe by a flexible tube, and a control device for controlling the movement mechanisms, the movement mechanisms including: a body connected to the flexible tube; a guide member installed on the body such that the guide member is slidable in an axial direction; a support leg drive mechanism provided on the guide member and having a support leg movable in a radial direction of the pipe, for pressing the support leg against an inner wall of the pipe, thereby to hold the guide member kept unmovable in an axis direction of the pipe; a slide mechanism for relatively sliding the guide member and the body, with the support leg pressed against the inner wall of the pipe, thereby to slide the body in the axis direction of the pipe, wherein the control device controls the in-pipe movement device so as to move in a pipe by itself, by sequentially operating the plurality of movement mechanism in a predetermined order.

According to a second aspect of the present invention, there is provided an in-pipe work apparatus comprising: at least two movement mechanisms provided separately in a longitudinal direction of a pipe; a work device for carrying out a job in the pipe; a flexible tube for connecting the at least two movement mechanisms and the work device with each other, with a flexibility maintained therebetween; and a control device for controlling the movement mechanisms and the work device from a remote place, to make the movement mechanisms operate sequentially in a predetermined order, so as to move by itself, and for making the work device carry out the job in the pipe.

According to a third aspect of the present invention, there is provided an in-pipe work apparatus according to claim 8, wherein the work device has a branch pipe process device for processing a branch pipe provided on the pipe, the branch pipe process device including: a process device body connected to the flexible tube; a head arranged such that the head can be freely projected from and contracted into the process device body in a radial direction of the pipe and can be freely rotated around an axis of projection and contraction of the head; a head drive mechanism for inserting the head into the branch pipe and for rotating the head, when the head is positioned with respect to the branch pipe; a centering mechanism provided on the process device body, for aligning a center axis of the branch pipe with a rotation center axis of the head; and a laser irradiation means provided on the head, for irradiating a laser beam on a process portion of the branch pipe.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a schematic perspective view showing a main part of a support leg drive mechanism comprised in a movement mechanism shown in FIGS. 2 and 3;

FIG. 5 is a cross-section of the movement mechanism shown in FIG. 2, cut along a line V—V;

FIG. 6 is a cross-section of the movement mechanism shown in FIG. 2, cut along a line VI—VI;

FIG. 17 is a view for explaining a branch pipe detection state in a fifth embodiment;

FIG. 18 is also a view for explaining a branch pipe detection state;

FIG. 24 is a view specifically showing a structure of a head;

FIG. 25 is a view specifically showing a structure of a head according to a ninth embodiment;

DETAILED DESCRIPTION OF THE INVENTION

In the following, an embodiment of the present invention will be explained with reference to the drawings.

Explanation will be made to an embodiment of an in-pipe work apparatus comprising an in-pipe movement device, at first, and then, explanation will be made to a T-shaped welding/cutting device comprising the in-pipe movement device.

(First Embodiment)

Figure 1:
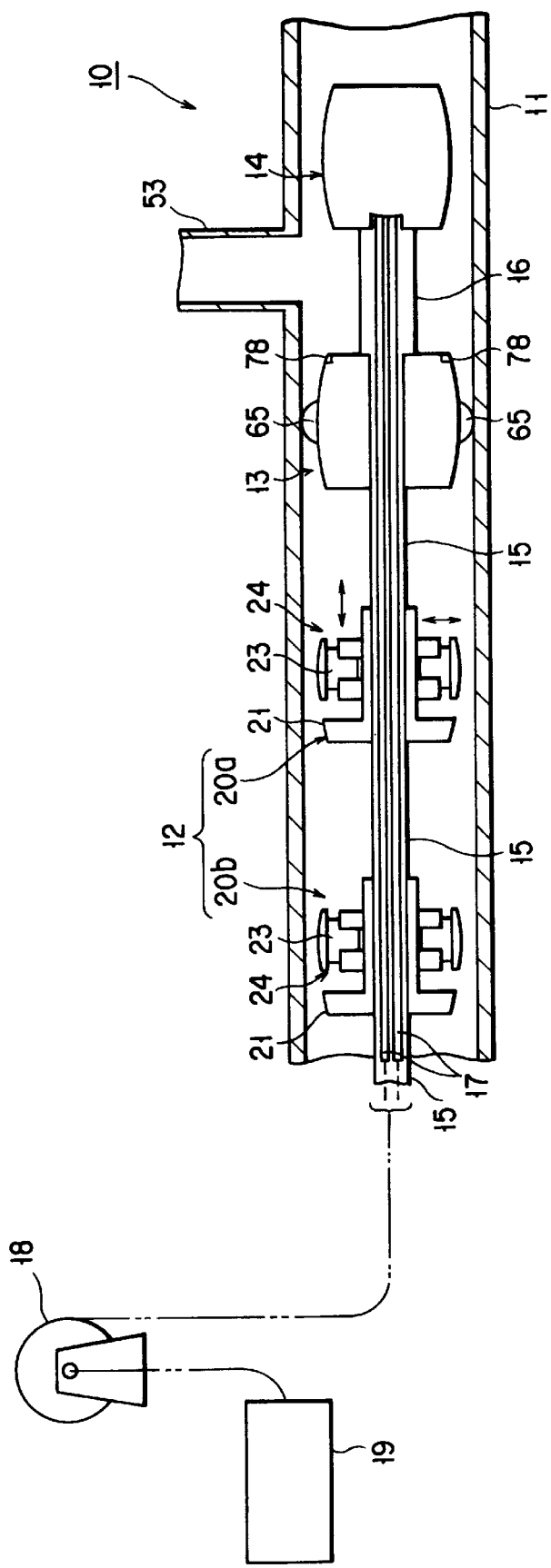
FIG. 1 is a view schematically showing the structure of a first embodiment of an in-pipe work apparatus according to the present invention.

FIG. 1 is a view showing a schematic structure of a first embodiment of an in-pipe work apparatus according to the present invention. The in-pipe work apparatus 10 moves by itself in a pipe 11, carrying out jobs such as welding-cutting. The in-pipe work apparatus 10 comprises an in-pipe movement device 12, a movement support cart 13, and a work device 14, which are connected in series in the longitudinal direction of the pipe 11 through flexible tubes 15 and 16.

Material of the flexible tubes 15 and 16 should be selected so as to be flexible and capable of withstanding a tension force or a compression force which acts between component devices 12, 13, and 14 constituting the in-pipe work apparatus 10.

In addition, electric power supply cables 17 extended from the in-pipe movement device 12, the movement support cart 13, and the work apparatus 14 are included in the flexible tubes 15 and 16. These cables 17 contained in the flexible tube 15 are guided to the outside of the pipe 10 and are wound up by a cable winding device shown in FIG. 18.

Further, the cables 17 are connected to a control board 19 through the cable winding device 18. Therefore, the in-pipe work apparatus 10 is remotely controlled by the control board 19.

Thus, since cables 17 extended from the in-pipe work apparatus 10 are contained in a flexible tube 15, a friction generated between the cables 17 and the inner wall of the pipe 11 can be reduced. In addition, there is a merit that cables need not be of a composite type.

Although the in-pipe work apparatus 10 is controlled by cables 17 extended from the control board 19 in the above example, it is possible to control the in-pipe work apparatus 10 by radio remote control operation from a control board 19, without providing such cables.

In the next, explanation will be made to an in-pipe movement device 12.

The in-pipe movement device 12 includes a pair of movement mechanisms 20a and 20b arranged apart from each other in the longitudinal direction of a pipe 11. The pair of movement mechanisms 20a and 20b are connected to each other by a flexible tube 15 having a flexibility, and is capable of making the device 12 smoothly and securely move by itself in the pipe 11. Thus, since paired movement mechanisms 20a and 20b are arranged apart from each other in the longitudinal direction of a pipe 11, the respective mechanisms can have small and compact sizes.

Figure 2:
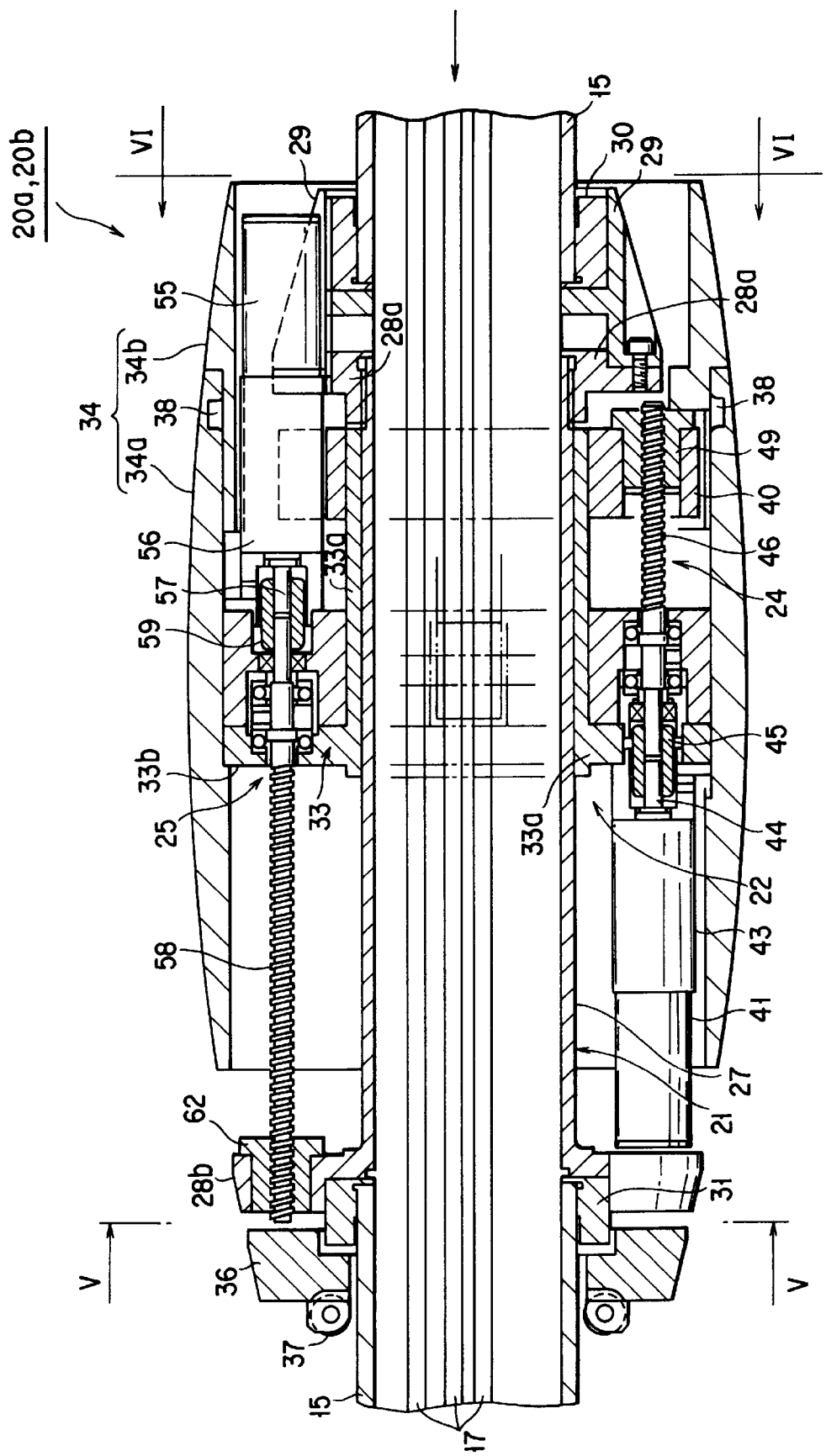
FIG. 2 shows a pair of movement mechanisms comprised in an in-pipe work apparatus shown in FIG. 1 and is a longitudinal cross-section cut along a line II—II in FIG. 5.
Figure 3:
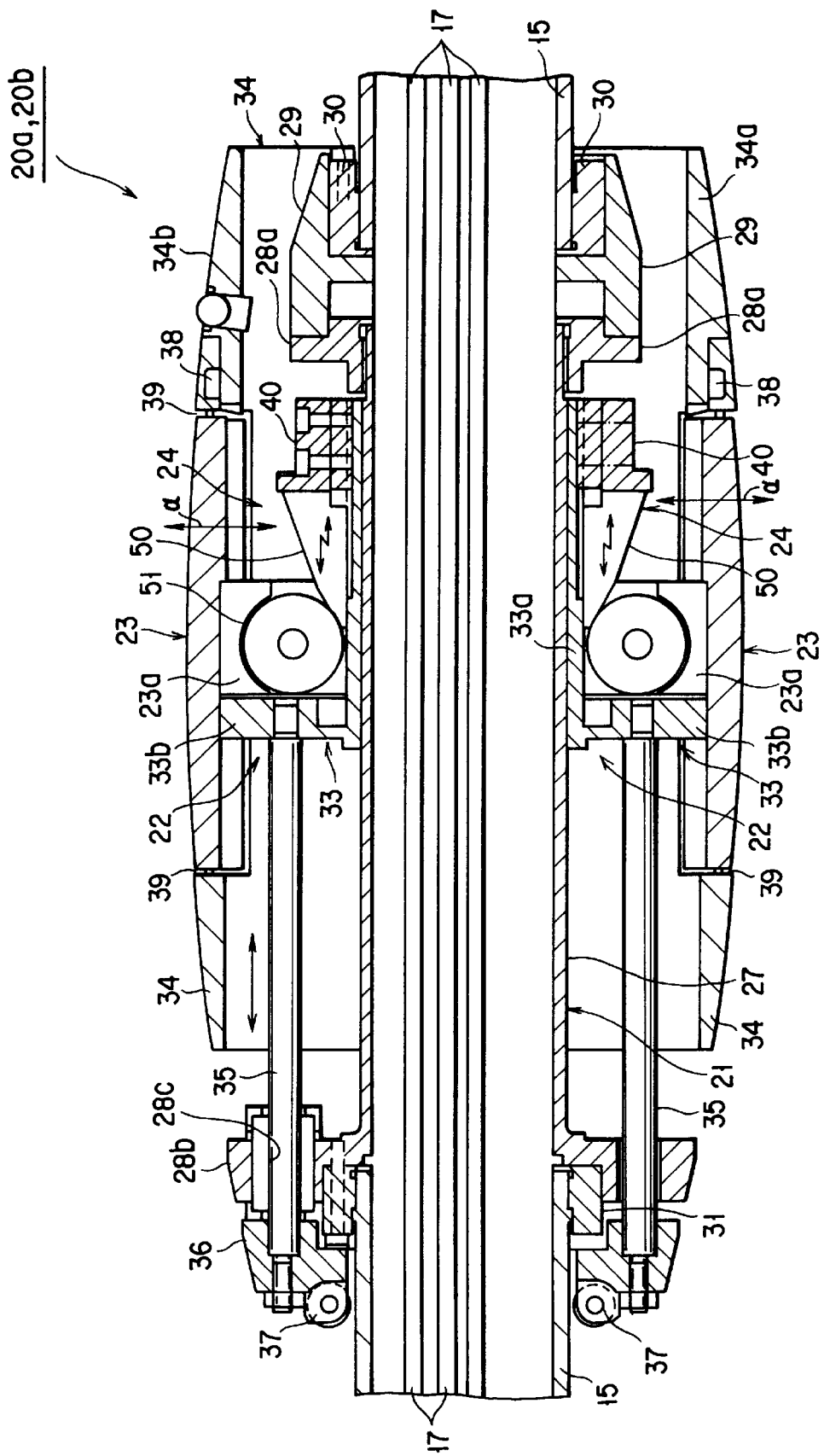
FIG. 3 shows a pair of movement mechanisms of a movement device shown in FIG. 2 and is a longitudinal cross-section cut along a line III—III in FIG. 6.

FIG. 2 shows a cross-section cut along a plane including the center axis of the flexible tube 15. FIG. 3 shows a longitudinal cross-section cut along a place which also includes the center axis of the flexible tube 15 and is perpendicular to the cross-section of FIG. 2.

The movement mechanisms 20a and 20b include a sleeve-like or cylindrical movement mechanism body 21 connecting the flexible tube 15 at both sides of the body 21, a guide mechanism 22 provided on the outer circumferential surface of the movement body 21 such that the mechanism 22 is slidable in the axial direction, and a body slide mechanism 25 provided in the guide mechanism 22, for driving the movement mechanism body 21 and the guide mechanism 22 to be relatively slid.

In addition, as shown in FIG. 3, the guide mechanism 22 is provided with a support leg 23 arranged to be movable in a direction indicated by an arrow α in the figure (or in the radial direction of the pipe 11), and a support leg drive mechanism 24 for moving forward and backward the support leg 23 in the direction α.

At first, the movement mechanism body 21 will be explained below.

The movement mechanism body 21 has a sleeve-like body member indicated by a reference 27 in FIGS. 2 and 3. The body member 27 is made of metal or plastic having a high rigidity, such as steel or the like. Flange members 28a and 28b for installing a flexible tube 15 are respectively fixed, by screwing, to the front and rear end sides of the body member 27.

A cylindrical joint member 29 is fixed to the flange member 28a provided at the front end side of the body member 27, and a ring-like connector 30 fixed to an end potion of the flexible tube 15 is engaged in and fixed to the joint member 29.

A ring-like connector 31 fixed to an end potion of the flexible tube 15 is engaged in and fixed to the flange member 28b provided at the rear end side of the body member 27.

According to the structure as described above, the flexible tube 15 is connected to both sides of the movement mechanism body 21. Specifically, a plurality of mechanisms including the pair of movement mechanism 20a and 20b are connected to each other by the flexible tube 15, so that the entire apparatus has a flexibility.

In the next, explanation will be made to the guide mechanism 22 and the drive mechanism 25 for driving the guide mechanism 22.

The guide mechanism 22 has a support frame 33 which is inserted in the body member 27 such that the support frame 33 is slidable in the axial direction, as shown in FIG. 2. The support frame 33 comprises a cylindrical boss portion 33a inserted in the body member 27 and a disk-like flange portion 33b provided at an end portion of the boss portion 33a.

A cylindrical slide guide 34 is fixed on the outer circumferential surface of the flange portion 33b of the support frame 33. The slide guide 34 comprises a guide body 34a and a front end guide 34b installed at the front end side of the guide body 34a, and the outer circumferential surface of the guide 34 is shaped to have a contour of a smooth arc, like an outer surface of a barrel.

As shown in FIG. 2, a wiring container groove 38 for containing wires such as motor wires or the like is provided at the connecting portion between the guide body 34a and the front end guide 34b, such that the groove extends in the circumferential direction.

Note that material which has a small friction coefficient and is less worn, e.g., self-lubricating material impregnated in oil is selected as material of the slide guide 34, since the slide guide 34 has a contact with the inner wall of the pipe 11.

In addition, as shown in FIG. 3, an end of a guide rod 35 for guiding the support frame 33 is fixed to a flange portion 33b of the support frame 33. The other end of the guide rod 35 extends backwards, penetrating slidably through a guide hole 28c formed in an outer circumferential flange 28b of the body barrel 27, and is fixed to a ring-like end piece denoted at a reference 36, by a tightening means. The end piece 36 is provided with a plurality of guide rollers 37 arranged at predetermined intervals in the circumferential direction, and the guide rollers 37 are rotatably in contact with the flexible tube 15.

According to the structure as described above, the movement mechanism 22 can move along the body member 27, guided by the guide rod 35.

In addition, the support frame 33 of the movement mechanism 22 can be driven by the slide mechanism 25 shown in FIG. 2.

The slide mechanism 25 has a motor 55 fixed to the slide guide 34. A speed reducer 56 is installed in the output side of the motor 55, and an output shaft 57 thereof is projected into the flange portion 33a of the support frame 33.

The output shaft 57 is coaxially connected with a screw shaft 58 through a coupling 59, and the screw shaft 58 penetrates through the flange portion 33a and is screwed into an outer circumferential flange 28b installed on the body member 27.

Therefore, when the screw shaft 58 is rotated as the motor 55 operates, the movement mechanism 22 (or support frame 33) is driven to slide in the axial direction. In addition, since the slide guide 34 is supported by the support frame 33, the slide guide 34 moves as the support frame 33 moves.

In the next, explanation will be made to a support leg drive mechanism 24.

The support leg drive mechanism 24 has a support leg denoted at a reference 23 in FIG. 3. The support leg 23 is provided such that the leg 23 is engaged in an opening 39 formed in a portion of the cylindrical slide guide 34 in the circumferential direction and such that the leg 23 projects from the slide guide 34 in the direction indicated by an arrow α in FIG. 3 (or in the radial direction toward the outside).

The support leg 23 is supported by a support leg member 23a having a guide roller 51, and the guide roller 51 is pushed to the outside in the radial direction, engaged with a pair of nail members 50 forming a wedge-like tapered surface, thereby projecting the support leg 23 from the slide guide 34.

The nail member 50 is held by a ring-like slider 40 supported to be slidable in the axial direction in the outer circumferential side of the body member 27, and this slider 40 is driven to slide in the axial direction by a motor denoted at a reference 41 shown in FIG. 4 (and FIG. 2), so that the guide roller 51 (or support leg support portion 23a) can be pushed up.

The motor 41 is a reversible motor, and two motors 41 are provided in this embodiment, such that the two motors are shifted by 180°, in the circumferential direction (although the number of motors provided in the circumferential direction may be three or more). The motors are arranged so as to operate in synchronization with each other.

As shown in FIG. 2, each motor 41 is fixed to the flange portion of the support frame of the movement mechanism 22 through a speed reducer 43, and has an output shaft 44 projected to the slider 40 side. The output shaft 44 is coaxially connected with a screw shaft 46 through a coupling 45, in the flange portion 33a of the support frame 33. Further, the front end portion of the screw shaft 46 is screwed into the slider 40.

Therefore, since the screw shaft 46 is driven to rotate as the motor 41 operates, the slider 40 into which the screw shaft 46 is screwed can be moved forward and backward in the shaft axis direction. The support leg 23 can therefore be driven to project or return in the shaft axis direction. Note that the support leg 23 may be energized in the returning direction by a spring not shown.

The support leg 23 is driven and projected to be pressed against the inner wall of the pipe 11, and thus has a function of holding movable 20a and 20b kept stopped. The contact surface of the support leg 23 is shaped to be round. However, the contact surface of the support leg 23 should preferably formed to have an area larger than the inner diameter area of a branch pipe 53, e.g., as about twice large as the inner diameter area, so that the support leg 23 might not enter into a branch pipe 53 when the pipe 11 is equipped with a branch pipe 53.

Note that FIGS. 5 and 6 show cross-sections cut along lines V—V and VI—VI shown in FIG. 2. The position relationship between respective mechanisms will be apparent from these figures.

In the next, explanation will be made to an operation of the drive mechanisms.

The movement device 12 is arranged so as to move by itself by operating alternately a pair of movement mechanisms 20a and 20b described above. Specifically, when moving in a pipe 11, the device 12 moves in the longitudinal direction of the pipe, following operation steps shown in FIGS. 7A to 7H.

Figure 7:
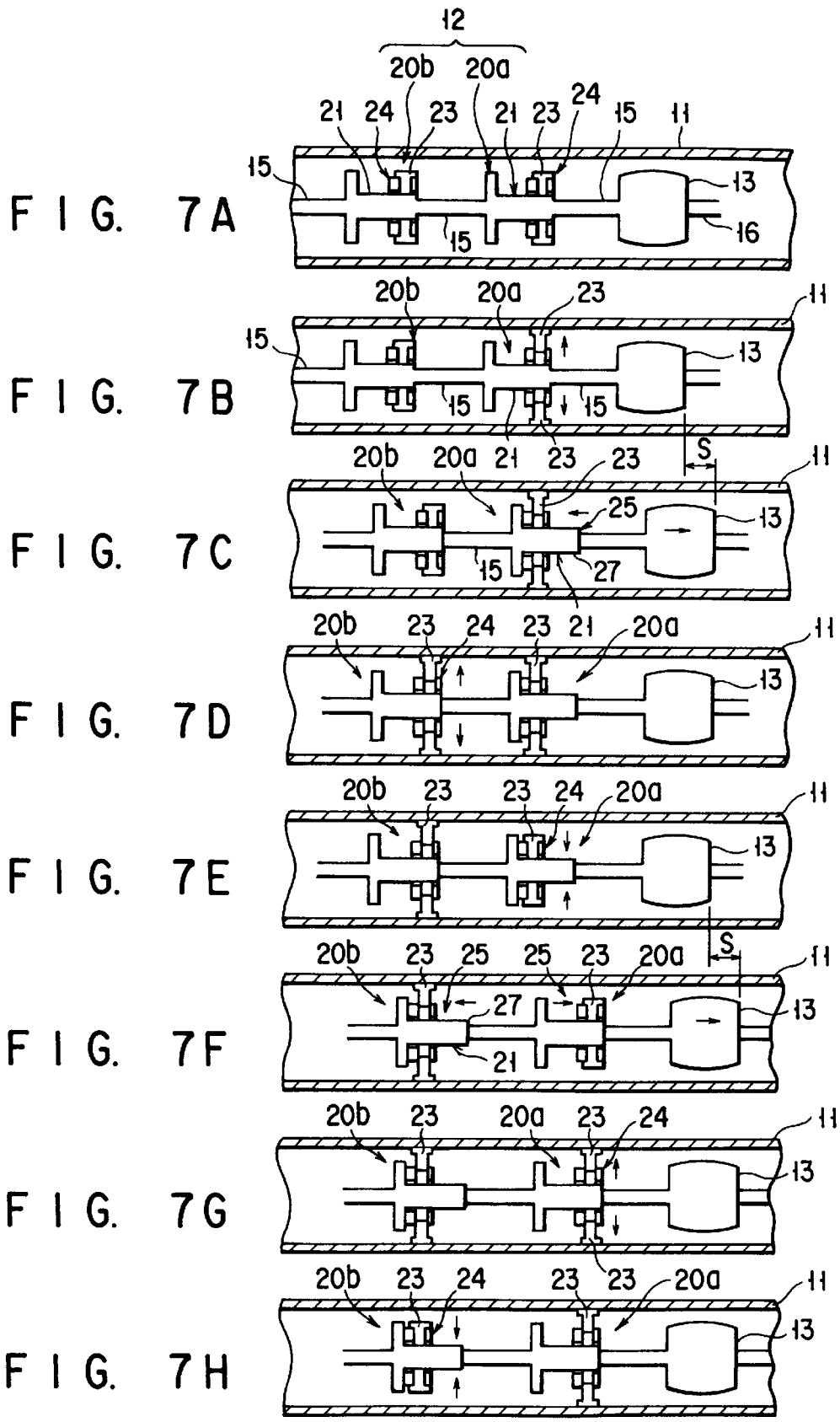
FIGS. 7A to 7H are step views showing an operation procedure of a movement device comprised in an in-pipe work apparatus according to the present invention.

When the movement device 12 moves forward in the pipe 11 from an initial state shown in FIG. 7A, the support leg 23 of one movement mechanism 20a is projected and stretched against the pipe 11, thereby fixing this movement mechanism 20a kept unmovable.

Subsequently, the slide mechanism 25 of the movement mechanism 20a is operated so as to make the body member 27 move forward by a required stroke S in relation to the support leg 23, as shown in FIG. 7C. As a result of this operation, the other movement mechanism 20b is driven to be closer to the movement mechanism 20a.

Next, as shown in FIG. 7D, the support leg 23 of the other movement mechanism 20b is projected and stretched against the pipe 11, thereby fixing the movement mechanism 20a kept unmovable. In this state, the support leg 23 of the movement mechanism 20a is driven in the returning direction, thereby releasing the fixed movement mechanism 20a, as shown in FIG. 7E. As a result, this movement mechanism is allowed to move forward.

Accordingly, the slide mechanism 25 of the movement mechanism 20b is then operated so as to make the body member 27 move forward by a required stroke S with respect to the support leg 23. As a result of this operation, the movement mechanism 20b is driven in the direction in which the movement mechanism 20b goes away from the movement mechanism 20a.

In this while, the movement mechanism 20a makes the slide mechanism 25 operate in the direction opposite to that shown in FIG. 7C, and the support leg 23 is positioned at the front end of the body member 27. Subsequently, the device goes into another initial state shown in FIG. 7B, through operation shown in FIGS. 7G and 7H.

As a result of the series of operations as described above, the movement mechanism 12 moves forward by a stroke of 2S. Thereafter, the in-pipe movement device 12 moves forward in the pipe 11 by itself like a spanworm, by repeating the operation states shown in FIGS. 7C to 7H.

As described above, the in-pipe work apparatus 10 comprises a movement support cart 13 and a work device 14 arranged in line through flexible tubes 15 and 16, in front of the movement device 12.

The movement support cart 13 is provided to detect a movement distance of the in-pipe work apparatus 10 in the pipe 11. Meanwhile, the work device 14 is provided to carry out necessary jobs, such as welding-cutting, in the pipe 11.

The movement support cart 13 comprises a pair of movement detect sensor wheels 65, as shown in FIG. 1. The pair of movement detect sensor wheels 65 are held by a mechanism shown in FIG. 8, provided in the movement support cart 13, and serve as a movement detect sensor.

This means that rotation of each wheel 65 is transmitted to a connection shaft 70 by a pair of bevel gears 71. Further, rotation of the connection shaft 70 is transmitted to an input shaft 74 of an encoder 73. The encoder 73 detects rotation of the movement detect sensor wheel 65, to measure the movement distance in the pipe 11.

Figure 8:
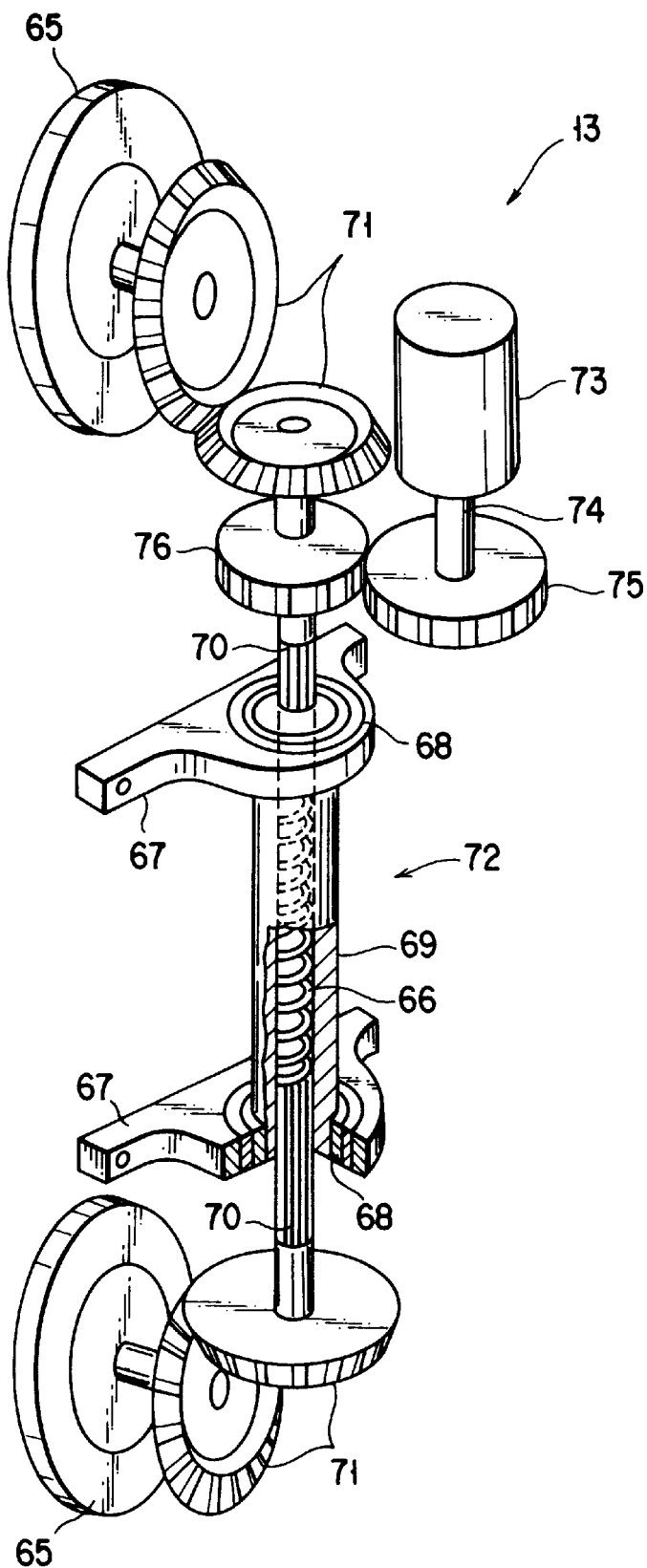
FIG. 8 is a view showing an internal structure of a movement support cart of the in-pipe work apparatus.

The connection shaft 70 is divided into upper and lower portions and are held by a holding means denoted at a reference 72 in FIG. 8, such that these portions are integrally rotated. The holding means 72 includes a pair of upper and lower support members 67 fixed to the movement support cart 13, and a cylindrical coupling 69 held to the support members 67 by bearings 68, such that the coupling 69 is rotatable and unmovable in the axial direction. This coupling 69 provides a spline connection between the upper connection member 70 and the lower connection member 70, and defines the upper and lower members 70 such that these members 70 rotate integrally.

In addition, a spring 66 is inserted between the upper and lower connection members 70 and functions to energize the pair of wheels 65 such that these wheels are elastically pressed into contact with the inner surface of the pipe 11.

Therefore, even when one of the wheels 65 is off from the inner wall of the pipe, rotation can be detected only by rotation of the other wheel 65 and the movement distance can be measured.

In this example, bevel gear mechanisms 71 are used for power transmission to the wheels 65. However, other power transmission means such as universal joints may be used in place of the bevel gear mechanisms.

Further, there is a case in which a branch pipe is branched from a pipe 11. To detect a position of a branch pipe 53 provided at a portion of the pipe 11, a movement support cart 13 is provided with a branch pipe detection sensor 78, as shown in FIG. 1. The branch pipe detection sensor 78 detects a break equivalent to a cross-sectional area of a branch pipe diameter, appearing in the inner wall of the pipe 11 in which the apparatus moves, due to presence of a branch pipe 53. A plurality of branch pipe detect sensors 78 are provided on the outer circumferential portion of the movement cart 13 along the local directions, so that the sensor 78 can respond in whatever direction the connecting position of the branch pipe 53 is oriented.

Meanwhile, the position of the branch pipe 53 branched from the pipe 11 is previously stored as branch pipe data in a control board 19. The control board 19 has a determination function of determining a movement position in a pipe 11, from the branch pipe data stored in the control board 19, a detection signal from the branch pipe detect sensor 78, and movement position data from a movement detect sensor. In addition, the control board 19 comprises a movement position correct means for specifying a movement position on the basis of a detection signal from the branch pipe detect sensor 78 and for correcting the movement position data from the movement detect sensor.

In the above embodiment of the present invention, explanation has been made to an example in which a movement support cart 13 is provided and this cart 13 is provided with a movement detect sensor and a branch pipe detect sensor. However, the movement detect sensor and the branch detect sensor may be provided in the side of a movement device 12 or a work device 14.

According to the structure as explained above, the following effects can be attained.

Firstly, in the in-pipe work apparatus according to the present invention, respective mechanisms are provided, separated in the lengthwise direction of the pipe 11 to achieve a small and compact size, while respective mechanisms are connected by flexible tubes 15 and 16 to attain a flexibility. As a result of this, even when the pipe diameter is small or the curvature of a curved pipe portion is small, the work apparatus can be smoothly moved by itself in a pipe 11 without loss.

Further, according to the structure as described above, since the tractive force for moving the work apparatus in the pipe 11 can be generated from a stretching support leg 23 as a starting point, the work apparatus can be moved smoothly and securely in a pipe 11 by a large tractive force.

Secondly, according to an in-pipe work apparatus according to the present invention, cables 17 connected to the control board 19 can be contained in flexible tubes 15 and 16, and the cables 17 are prevented from having direct contacts with the inner wall of the pipe 11. According to the structure thus constructed, a friction force generated between the inner wall of the pipe 11 and the cables 17 can be reduced. In addition, since cables need not be of a composite type, demerits caused by adopting composite cables can be avoided.

(Second Embodiment)

In the next, with reference to FIG. 9 and following figures, explanation will be made to an in-pipe work apparatus comprising, in place of the work device 14 described above, a T-shaped pipe welding-cutting device 105 for welding/cutting a branch pipe 53 connected to a pipe 11 in a T-shaped layout. Note that a movement device 12 (20*a* and 20*b*) similar to that used in the first embodiment is used a movement device for driving the T-shaped pipe welding/cutting device 105 in the present embodiment, and therefore, explanation thereof will be omitted herefrom.

Figure 9:
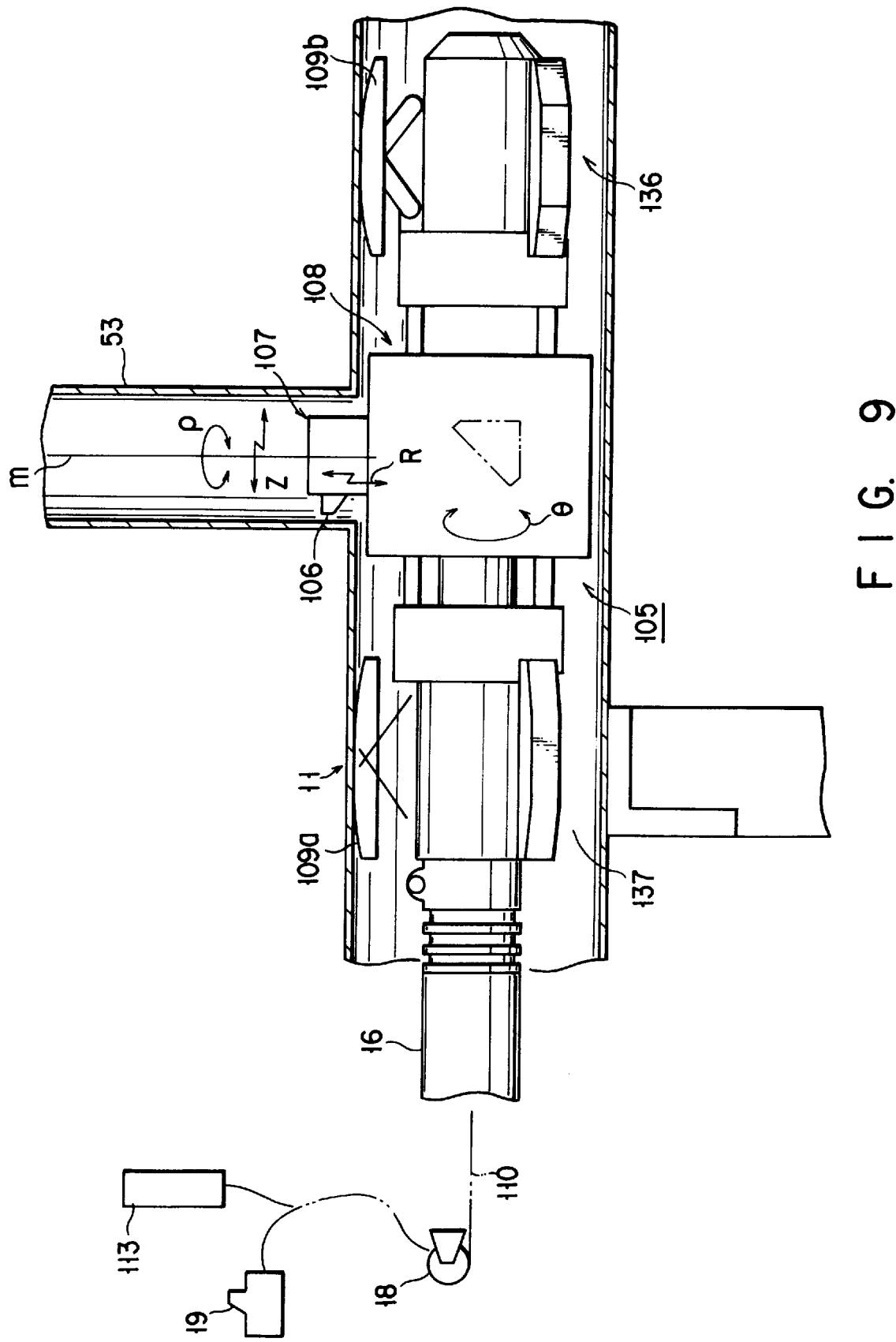
FIG. 9 is a view schematically showing a structure of a second embodiment.

In place of a work device 14 shown in FIG. 1, a T-shaped pipe cutting device 105 shown in FIG. 9 is connected to a flexible tube 16. The structure of the T-shaped pipe welding/cutting device 105 will be explained below with reference to FIG. 9.

FIG. 9 shows a state in which the T-shaped welding/cutting device 105 according to this embodiment is positioned with respect to the branch pipe 53. This T-shape pipe welding/cutting device 105 comprises a head 107 having a laser beam injection hole 106, a body 108, and a centering mechanism 109. The body 108 includes a drive mechanism, a YAG laser optical component, and a gas flow path for supporting welding or cutting.

The drive mechanism installed on the body 108 includes a θ-axis drive system which rotates in the circumferential direction of the pipe 11, a Z-axis drive system which linearly acts in the axial direction of the pipe 11, a p-axis drive system which rotates in the circumferential direction of the branch pipe 53, and a R-axis drive system which linearly acts in the axial direction of the branch pipe 53.

Among these drive mechanisms, the θ-axis drive system and Z-axis drive system function to align the center axis m of the branch pipe 53 with the center axis of the head 107 such that the head 107 can be inserted in the branch pipe 53.

In addition, the head 107 can project from and return into the body 108. The R-axis drive system makes the head 107 functions to move linearly in the axial direction of the branch pipe 53, thereby making the head 107 inserted into the branch pipe 53. In addition, the p-axis drive system functions to rotate the laser injection hole 106 formed in the head 107, in the circumferential direction in the branch pipe 53.

Connection cables provided in the flexible tube 16 include a YAG laser transfer fiber, electrical wires for driving and signals, and a gas tube, in addition to those explained in the first embodiment. In FIG. 9, a reference 113 denotes a YAG laser oscillator. The gas tube is connected to a gas bomb not shown. A laser oscillator may be provided in the in-pipe work apparatus, in place of using a YAG laser transfer fiber to introduce a laser beam from outside.

In the next, the structure of the body 108 will be explained in details, with reference to FIGS. 10 and 11.

Figure 10:
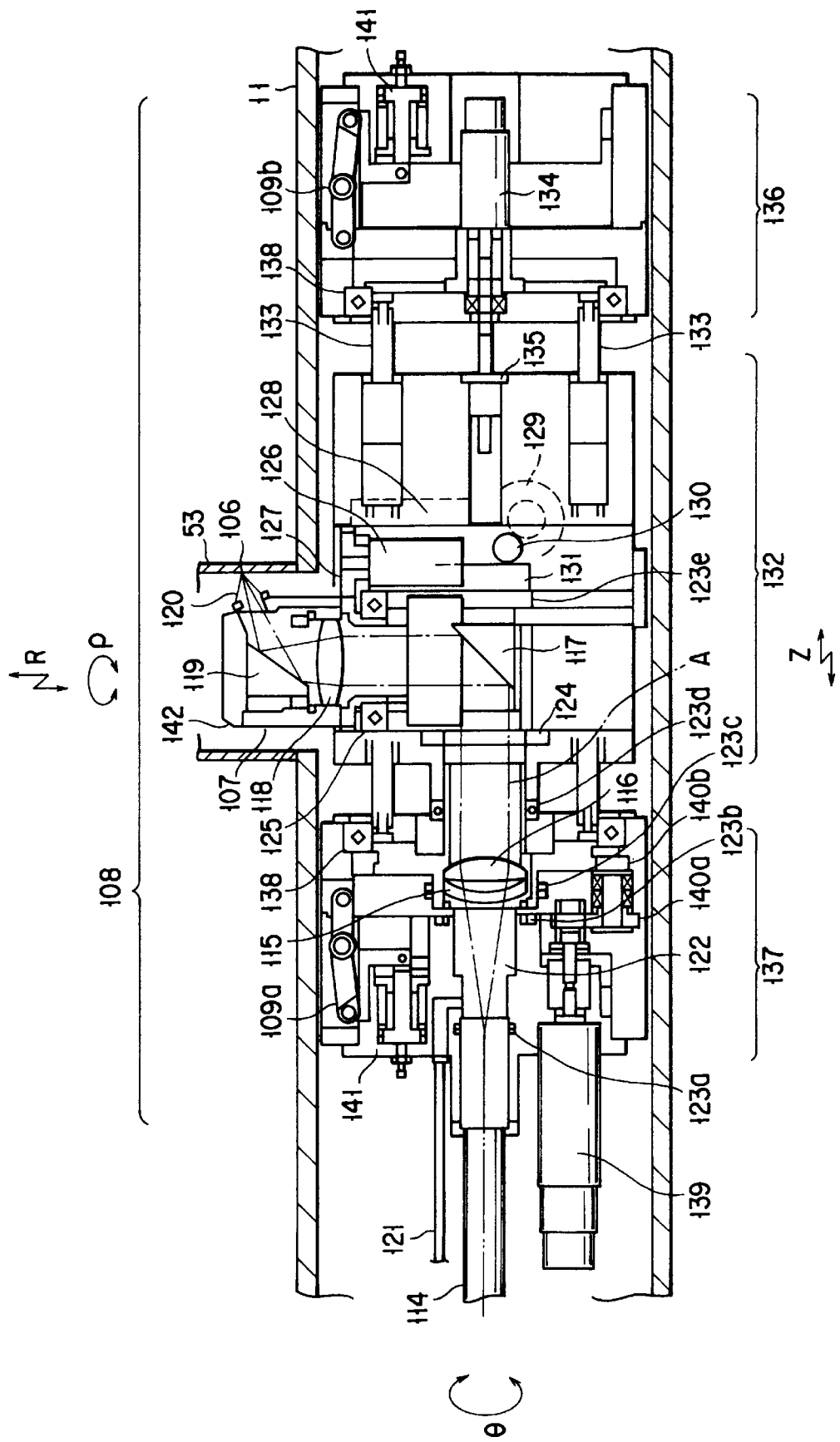
FIG. 10 is a longitudinal view for explaining an operation while working.

Here, FIG. 10 shows a state in which the head 107 is projected from the body 108 and is inserted in the branch pipe 53. FIG. 11 shows a state in which the head 107 is contained in the body 108 and the body 108 is allowed to move in the pipe 11.

At first, a supply path of a YAG laser beam for welding and cutting will be explained. A YAG laser beam is oscillated from a YAG laser oscillator 113 shown in FIG. 9 and is transferred to the body 108 through a YAG laser transfer fiber 114 shown in FIG. 10. Further, the laser beam is injected from the laser injection hole 106 through a first lens 115, a second lens 116, a first mirror 117, a third lens 118, and a second mirror 119, as is indicated by a one-dot-chain line A in FIG. 10.

The body 108 is connected with a gas tube 121, and a gas for supporting welding or cutting is supplied to a YAG laser beam passing potion 122. A gas supplied passes around the first lens 115, the second lens 116, the first mirror 117, the third lens 118, and the second mirror 119, and is guided to a nozzle 120 from which the gas is emitted.

The YAG laser beam passing portion 122 is air-tightly sealed by O-rings 123a to 123e and a packing 124, forming a structure which does not leak a filled gas.

Although a YAG laser beam is used in this embodiment, the present invention is not limited hitherto, but other known laser beams may be used.

A structure for driving the head 107 will be explained next.

At first, the ρ-axis drive system includes a ρ-axis bearing 125 for rotatably holding the head 107, and a ρ-axis rotation motor 126 and a ρ-spur gear 127 for driving the head 107 to rotate. Therefore, as the ρ-axis rotation motor 126 operates, the head 107 is driven to rotate, and as a result, the laser injection hole 106 rotates.

In the next, the R-axis movement mechanism functions to integrally hold the head 107 and the ρ-axis drive mechanism and to move forward and backward in the R-direction. Therefore, this R-axis movement mechanism includes a R-axis movement motor 128, a R-axis movement bevel gear 129 installed on the motor 128, a R-axis movement pinion 130 driven by the bevel gear 128, and a R-axis movement rack 131. Since the R-axis movement rack 131 is fixed to the side surface of the head 107, the head 107 is driven to move forward and backward in the R-axis direction, as the R-axis movement motor 128 operates.

In addition, the Z-axis drive system has a mechanism for holding the head 107, the ρ-axis movement mechanism, and a R-axis movement mechanism and for driving them in the Z-direction. Therefore, the Z-axis drive system includes a center cart 132, an LM guide 133, a Z-axis movement motor 134, and a Z-axis movement ball screw 135. THe center cart 132 holds the heat 107, the ρ-axis movement mechanism, and the R-axis movement mechanism. The LM guide 133 holds the center cart 132 to be rotatable in the Z-axial direction. The Z-axis movement motor 134 drives the center cart 132.

In the next, the θ-axis drive system will be explained.

The θ-axis drive system is provided on front and rear carts 136 and 137 which are provided before and after the body 108 and which have centering mechanisms 109a and 109b. Specifically, the θ-drive system consists of a θ-axis bearing for rotatably holding another end of the LM guide 133, and a θ-axis rotation motor 139 and θ-axis rotation spur gears 140a and 140b for rotating the body 108 in the θ-direction through the LM guide 133.

Figure 11:
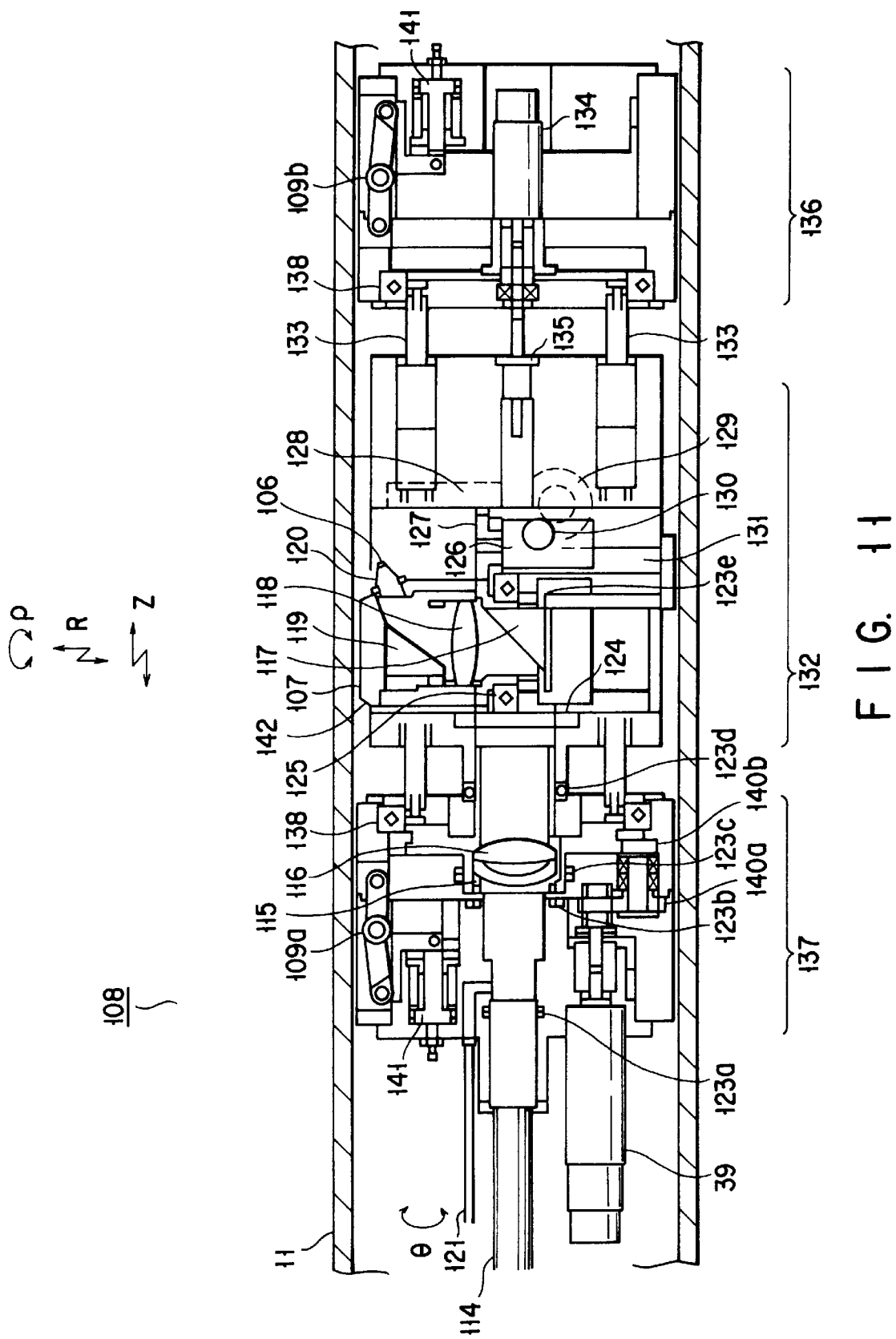
FIG. 11 is a longitudinal view for explaining an operation while moving.

If the head 107 is contained in the body 108 and does not interfere with the inner wall of the pipe 11 or the branch pipe 53, as shown in FIG. 11, the head 107 is rotatable in the θ-axis direction and is linearly movable in the Z-axis direction, so that the head 107 can be positioned with respect to the branch pipe 53 by operating the θ-drive system and the Z-drive system.

In addition, the front cart 136 and the rear cart 137 described above are provided with a plurality of centering mechanisms 109a and 109b which can be driven by an air cylinder 141, thereby constituting a structure in which the center axis of the T-shaped pipe welding/cutting device 105 with the center axis of the pipe 11.

In the next, operation of the T-shaped pipe welding/cutting device will be explained below.

At first, the T-shaped pipe welding/cutting device 105 is moved in the pipe 11, by operating the movement device 12 explained in the first embodiment. When the T-shaped pipe welding /cutting device 105 reaches an installation position of a branch pipe 53, compressed air is supplied to an air cylinder 41, to operate the centering mechanisms 109a and 109b, so that the center axis (or Z-axis direction) of the T-shaped pipe welding/cutting device 105 is aligned with the center axis of the pipe 11.

Further, the head 107 is driven in the R-axis direction and the θ-axis direction by slowly operating the θ-axis drive system and the Z-axis drive system, to align the head 107 with the center axis of the branch pipe 53. Further, the R-axis movement mechanism is operated to insert the head 107 into the branch pipe 53 such that the laser injection hole 106 is opposed to a predetermined portion to be processed (in FIG. 10). Note that the head 107 can be easily inserted into the branch pipe 53 since a tapered portion 142 is provided at the top of the head 107.

Subsequently, a gas which assists welding or cutting is supplied through a gas tube 121. The gas is injected through the laser injection hole 106 to the portion to be processed, and the gas functions to prevent oxidization of a welded portion when welding is carried out and to blow out melted metal when cutting is carried out. In addition, optical components heated by a laser beam can be cooled simultaneously by using the gas.

Subsequently, a YAG laser oscillator 113 is operated to transfer a YAG laser beam to the body 108 through a YAG laser transfer fiber 114, and the laser beam is irradiated as a converged beam onto an inner wall (or a portion to be processed) from the laser injection hole 106. In this state, the θ-axis drive system is operated, so that welding and cutting of a inner wall surface of a branch pipe can be carried out by rotating the laser injection hole 106 in the circumferential direction of the branch pipe 53 by one turn.

According to the structure as described above, welding or cutting of a branch pipe 53 can be carried out from inside of the pipe 11.

(Third Embodiment)

In the next, a third embodiment of the present invention will be explained.

The third embodiment relates to an in-pipe work apparatus including a T-shaped pipe welding/cutting device as a work device, like the second embodiment. Further, the work device of the fourth embodiment aims to achieve a small size in a manner in which respective drive systems of the T-shaped pipe welding/cutting device explained in the first embodiment are arranged separately from each other.

Figure 12:
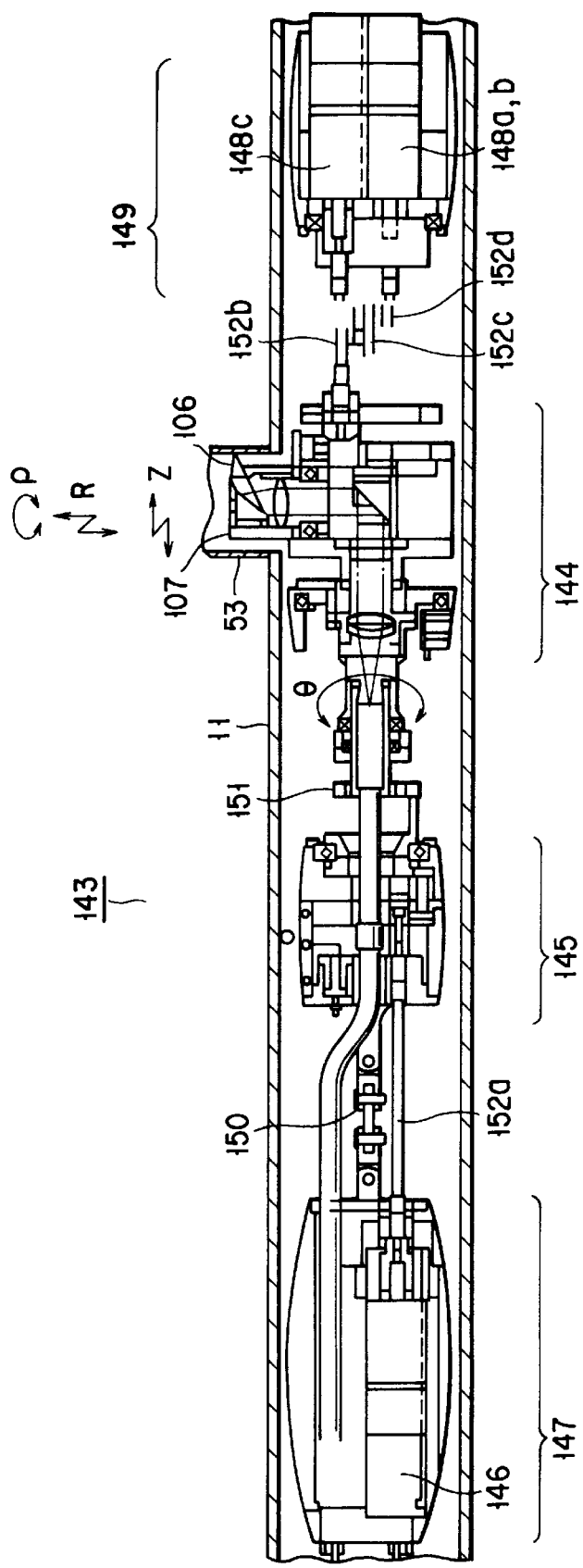
FIG. 12 is a view schematically showing a third embodiment.
Figure 13:
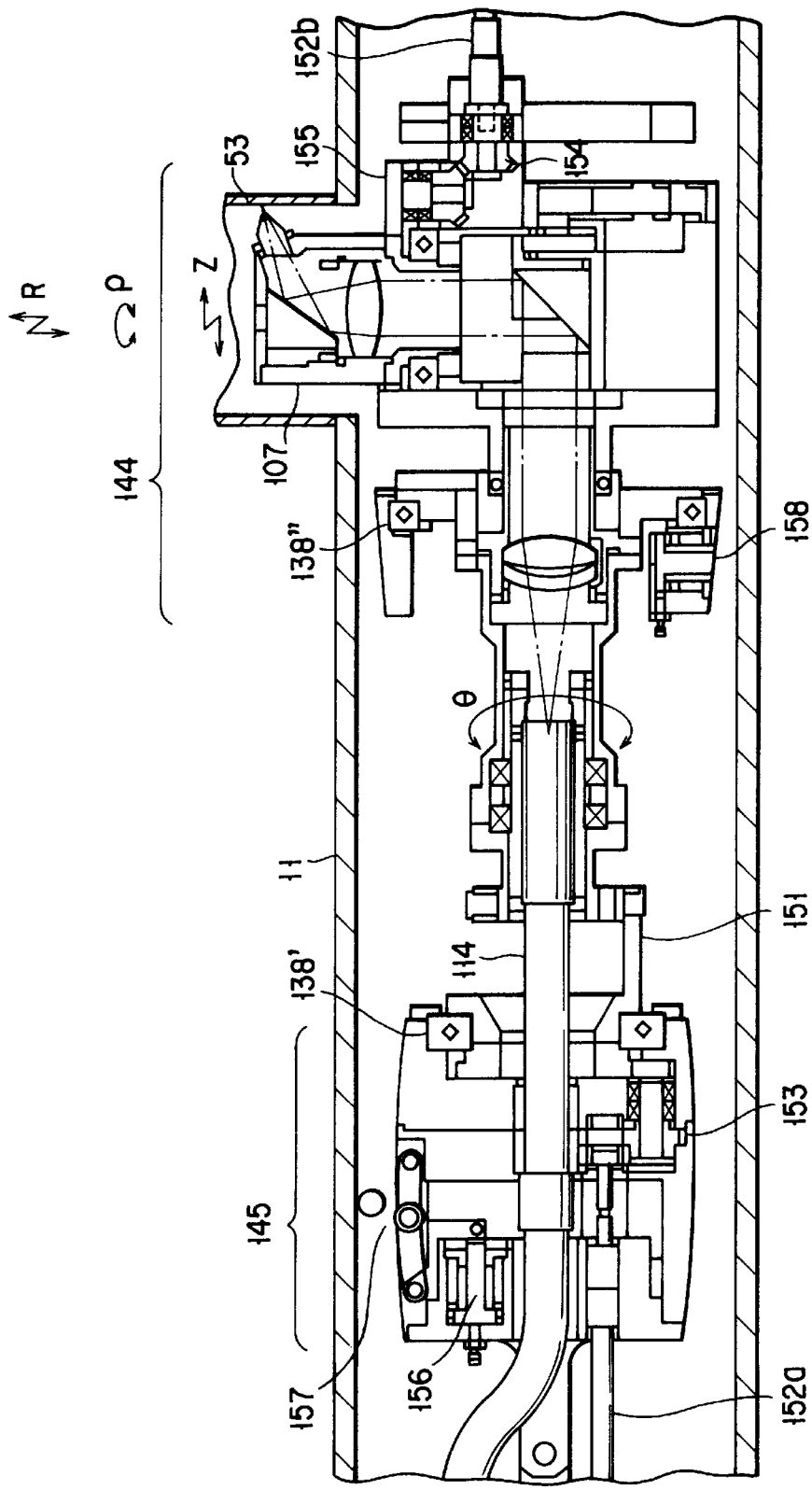
FIG. 13 is a longitudinal cross-section for explaining an operation while working.
Figure 14:
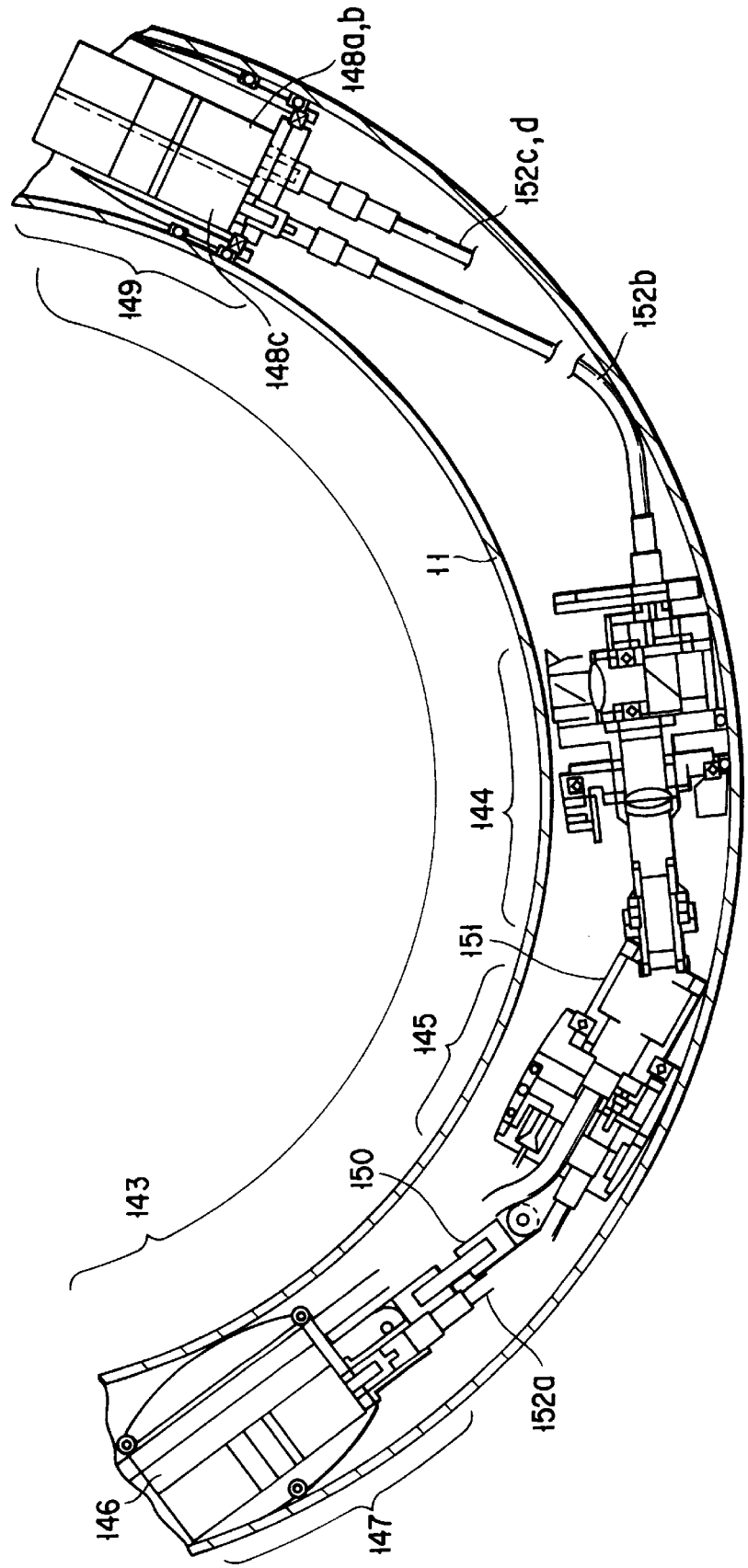
FIG. 14 is a view showing a form when the in-pipe work apparatus passes through a curved portion of a pipe.

FIG. 12 shows a schematic structure of a T-shaped pipe welding/cutting device 143 according to the present embodiment. FIG. 13 shows a specific structure of a main portion thereof. FIG. 14 shows a state in which the device is passing through a curved portion of a pipe.

Note that those components which have same functions as those in the second embodiment will be denoted by same reference numerals.

The T-shaped pipe welding/cutting device 143 has a welding/cutting cart 144. This cart 144 is provided with a head comprising a laser injection hole 106, a ρ-axis movement mechanism, a R-axis movement mechanism, and a Z-axis movement mechanism which do not include drive sources such as motors. Motors 148a, 148b, and 148c for ρ-axis driving, R-axis driving, and Z-axis driving respectively used for the ρ-axis movement mechanism, R-axis movement mechanism, and Z-axis movement mechanism are provided on a motor cart denoted by 149 in the figure. In addition, a θ-axis movement mechanism is provided on a θ-axis drive cart 145, and a θ-axis drive motor 146 for operating the θ drive mechanism is provided on a θ-axis motor cart denoted at 147 in the figure.

Further, the θ-axis motor cart 147 and the θ-axis drive cart 45 are connected by a link 150. The θ-axis drive cart 145 and a welding/cutting cart 144 are connected by a universal joint 151 which allows only shifts in angle. The θ-axis drive motor 146 and the θ-drive cart 145 are connected by a flexible shaft 152a which is flexible and can transmit torque.

In addition, three axis drive motors 148a, 148b and 148c for the ρ-axis, R-axis, and the Z-axis are respectively connected with the ρ-axis, R-axis, and Z-axis movement mechanisms provided on the welding/cutting cart 144.

In the next, the structures of the θ-axis drive cart 145 and the welding/cutting cart 144 will be explained with reference to FIG. 13.

At first, a YAG laser transfer fiber 114 penetrates through the θ-axis drive cart 145 and is connected to the welding/cutting cart 144. YAG laser optical components and a flow path of a gas for assisting welding and cutting are arranged in the same structure as the second embodiment shown in FIG. 10.

In addition, rotation of the θ-drive motor 146 is transmitted to the θ-axis drive cart 145 through a flexible shaft 152a, and the speed of the rotation is reduced by a θ-axis drive spur gear 153 provided on a θ-axis drive cart 145. Thereafter, the rotation is transmitted to a welding/cutting cart 144 through a universal joint supported by a θ-axis bearing 138', thereby to rotate the head 107 supported by a θ-axis bearing 138", in the θ-axis direction.

The rotation of the ρ-drive motor 148a is transmitted to the welding/cutting cart 144 through a flexible shaft 152b, and the speed of the rotation is reduced by a ρ-axis drive bevel gear 154 and a ρ-axis drive spur gear 155 provided on the welding/cutting cart 144, thereby to rotate the head 107 in the ρ-axis direction.

The movement mechanisms for the R-axis and the Z-axis are arranged in the same structures as those in the first embodiment, except that these mechanisms are driven by two axis drive motors 148b and 148c for the R-axis and Z-axis, which are separately provided on the motor cart 149.

Note that a centering mechanism 157 operated by an air cylinder 156 is provided on the θ-axis drive cart 145, in the present embodiment. In addition, a welding/cutting cart 144 is provided with a centering mechanism 158 constituted by an air cylinder. According to this structure, the center axis of the θ-axis drive cart 145 and the center axis of the welding/cutting cart 144 are aligned with the center axis of the pipe 11.

Operation of a T-shaped welding/cutting device 143 of a connection type constructed as described above will be explained below.

At first, as shown in FIG. 14, when the pipe 11 includes a curved portion, the T-shaped pipe welding/cutting device 143 can pass the curved portion and operate well like at a straight pipe portion since the link 150, the universal joint 151, and the flexible shaft 152a to 152d can be bent.

Further, when the T-shaped pipe welding/cutting device 143 reaches an installation position of a branch pipe 53 including a portion to be processed, compressed air is supplied to an air cylinder 156 for a centering mechanism 157 and a centering mechanism 158, so that the welding/cutting cart 144 and the θ-axis cart 145 are respectively centered on the center axis of the pipe 11.

Further, since the welding/cutting cart 144 and the θ-axis cart 145 are connected with each other by a universal joint 151 which allows only an angle gap but does not allow a parallel movement, the center axis of the entire T-shaped pipe welding/cutting device 143 can be aligned with the center axis of the pipe 11.

Note that the procedure of inserting the head 107 in the branch pipe 53 and carrying out welding/cutting is the same as that shown in the second embodiment shown in FIG. 10. Therefore, explanation of the procedure will be omitted herefrom.

According to a T-shaped pipe welding/cutting device according to the present embodiment, mechanisms required for welding/cutting are separately arranged in the axis direction of the pipe 11, so that the size of the device can be reduced to be small and compact, in the radial direction of the pipe 11. As a result of this, the device can excellently respond to a pipe 11 having a small diameter or a curved portion.

(Fourth Embodiment)

In the next, explanation will be made to a fourth embodiment of a T-shaped pipe welding/cutting device according to the present invention.

Figure 15:
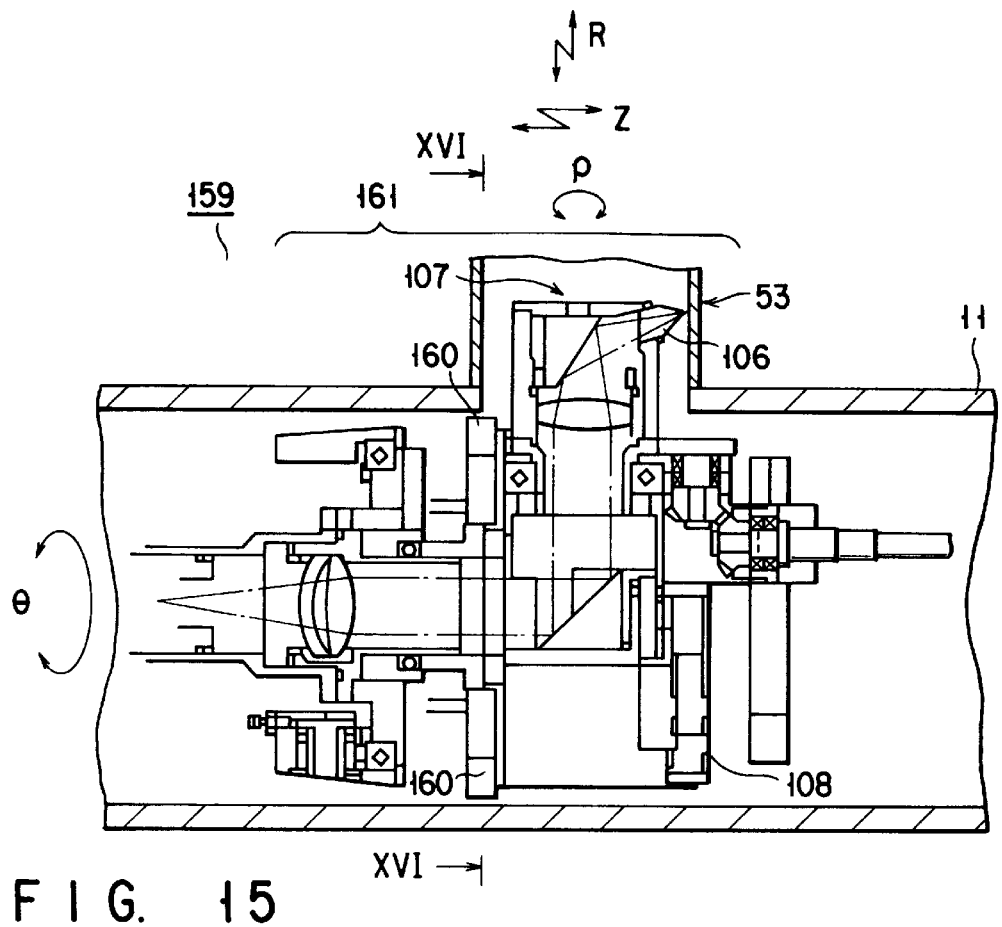
FIG. 15 is a view schematically showing a fourth embodiment.

The T-shaped pipe welding/cutting device 159 according to this embodiment is constructed such that the welding/cutting cart 144 of the third embodiment shown in FIG. 122 is replaced with another welding/cutting cart denoted at 161 in FIG. 15.

The welding/cutting cart 161 has a basic mechanism for carrying out welding and cutting on a branch pipe 53, which is similar to that of the welding/cutting cart 144 of the third embodiment, and therefore, explanation of this basic structure will be omitted herefrom. However, the welding/cutting cart 161 has branch pipe detect sensors 160 for monitoring an inner wall of the pipe 11 to detect a position of the branch pipe 53. Each sensor 160 is, for example, a spiral current displacement sensor, and detects a branch pipe 53 from a fact that the inner wall of the pipe 11 breaks off over an area equivalent to the cross-section of the branch pipe 53, at the portion of the branch pipe 53.

Figure 16:
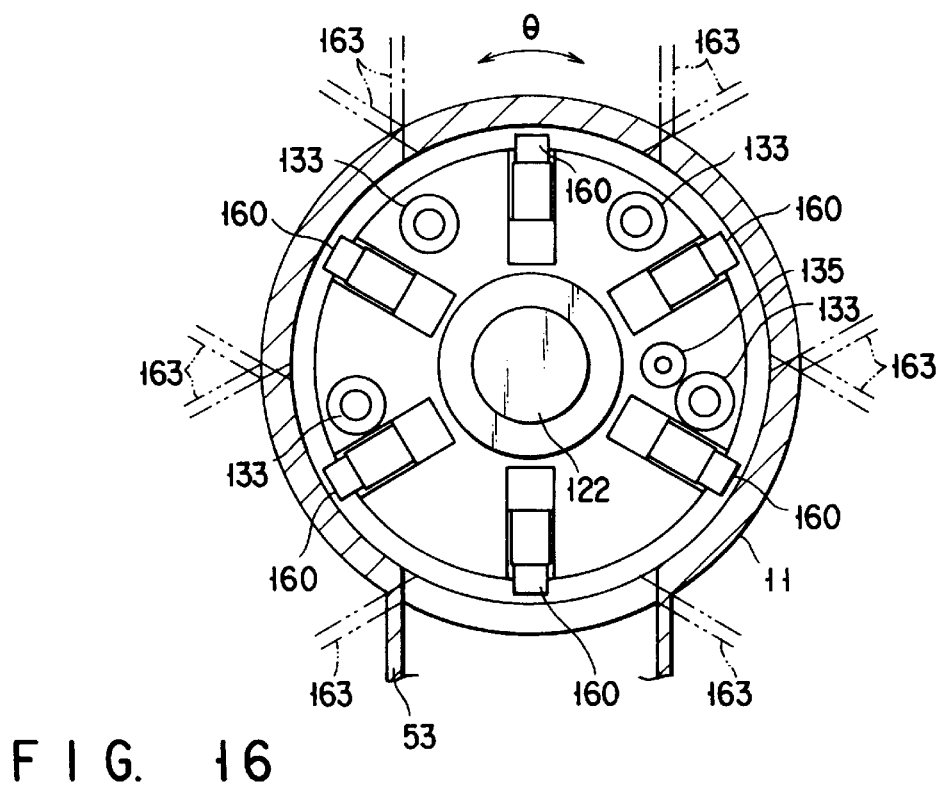
FIG. 16 is a cross-section cut along a line A—A in FIG. 15.

FIG. 16 shows a cross-section of an installation portion of the branch pipe detect sensors 160. In this figure, a reference 162 indicates an opening portion of a branch pipe 53. As shown in this figure, detection is enabled regardless of an installation position of the branch pipe 53 is a virtual line 163 of a branch pipe is drawn such that opening portions of pipes overlap each other, and a branch pipe detect sensor 160 is arranged on the center axis of each virtual line 163. Note that FIG. 16 shows a YAG laser beam passing portion 122, an LM guide 133 forming part of a Z-axis movement mechanism, and a Z-axis movement ball screw 135.

In the next, operation of the T-shaped pipe welding/cutting device according to the fourth embodiment will be explained below.

When a branch pipe detect sensor 160 reaches a branch pipe 53 while the T-shaped pipe welding/cutting device 159 is moving in the pipe 11, the distance between the inner wall surface (of a metal surface) of the pipe 11 and the branch pipe detect sensor 160 changes so that a signal from the branch pipe detect sensor 160 changes.

Based on a change in the signal, the movement of the T-shaped pipe welding/cutting device 159 is stopped. Then, centering o the T-shaped pipe welding/cutting device 159 is carried out with respect to the pipe 11, by operating centering mechanisms 157 and 158. However, in this state, the center line of the branch pipe detect sensor 160 does not always correspond to the center line of the branch pipe 53. FIG. 17 shows a state in which the branch pipe detect sensor 160 is shifted from the center of the branch pipe 53.

Therefore, by rotating the branch pipe detect sensor 160 in the θ-axis direction (by moving upward the branch pipe detect sensor 160 in FIG. 17), an edge of the opening portion of the branch pipe 53 indicated by P1 in FIG. 18 is detected by the branch pipe detect sensor 160.

In the next, the branch pipe detect sensor 160 is rotated in an opposite direction in the θ-direction (by moving downward the branch pipe detect sensor 160 in FIG. 17), to detect an edge of the opening portion of the branch pipe 53 indicated by P2 in FIG. 18. Further, the θ-axis is returned toward the point P1 from the point P2 by a distance equivalent to an half of the displacement between the points P1 and P2. Then, the branch pipe detect sensor 160 is positioned on the center axis (or the line P3–P4) of the pipe 11 shown in FIG. 18.

Subsequently, the branch pipe detect sensor 160 is moved in the Z-axis direction (or moved to the left-hand side in FIG. 8), thereby to detect an edge of the opening portion of the branch pipe indicated by P3 in FIG. 18 by means of a branch pipe detect sensor 160.

Further, the sensor 160 is moved reversely in the Z-axis direction (or to the right-hand side in FIG. 18), to detect an edge of the branch pipe opening portion indicated by P4 in FIG. 18. Subsequently, the Z-axis is returned toward the point P3 from the point P4 by a distance equivalent to an half of the movement amount between the points P3 and P4, and then, the branch pipe detect sensor 160 is positioned on the center axis of the branch pipe 53.

Next, the R-axis movement mechanism is operated in this state, so that the head 107 is inserted into the branch pipe 53. The procedure of carrying out welding/cutting after insertion of the head is similar to that of the second embodiment shown in FIG. 10, and explanation thereof will be omitted herefrom.

According to the structure constructed as described above, the position of a branch pipe 53 can be detected by branch pipe detect sensors 160 and a head 107 can be securely inserted in the center of the branch pipe 53 on the basis of the detection of the position of the branch pipe.

(Fifth Embodiment)

A fifth embodiment of a T-shaped pipe welding/cutting device according to the present invention will be explained below.

Figure 19:
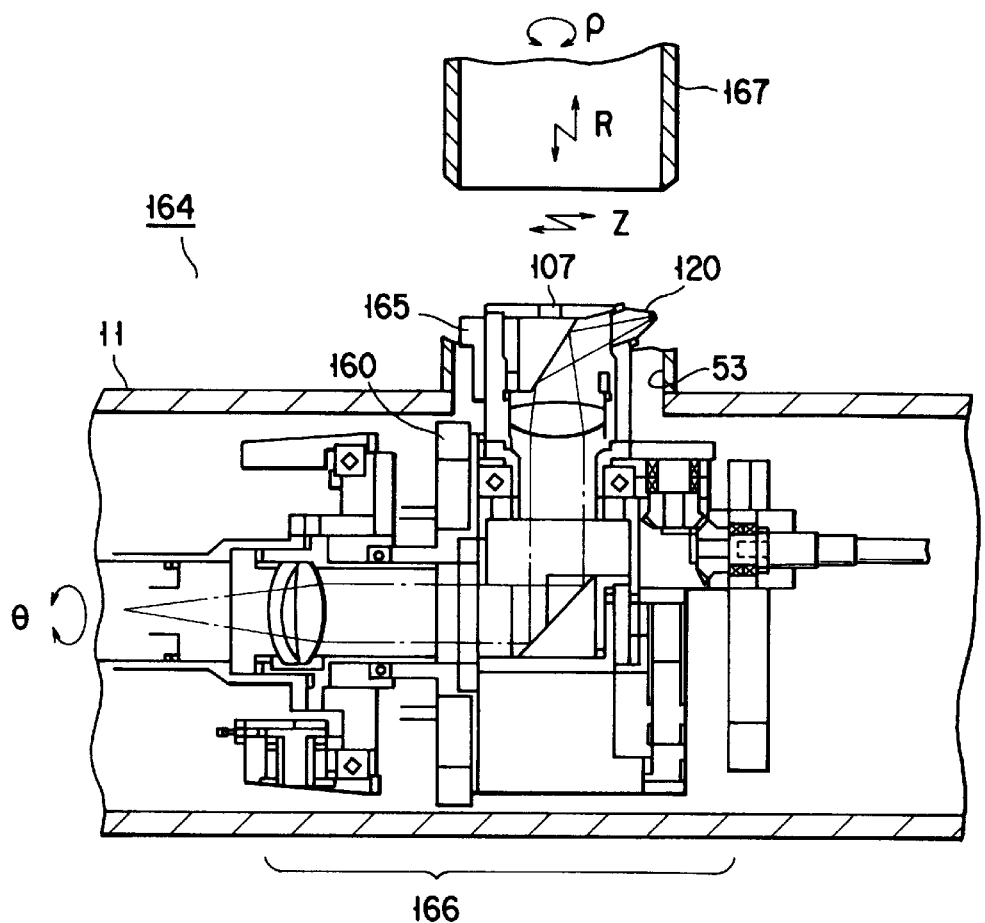
FIG. 19 is a cross-section of a welding/cutting cart.
Figure 20:
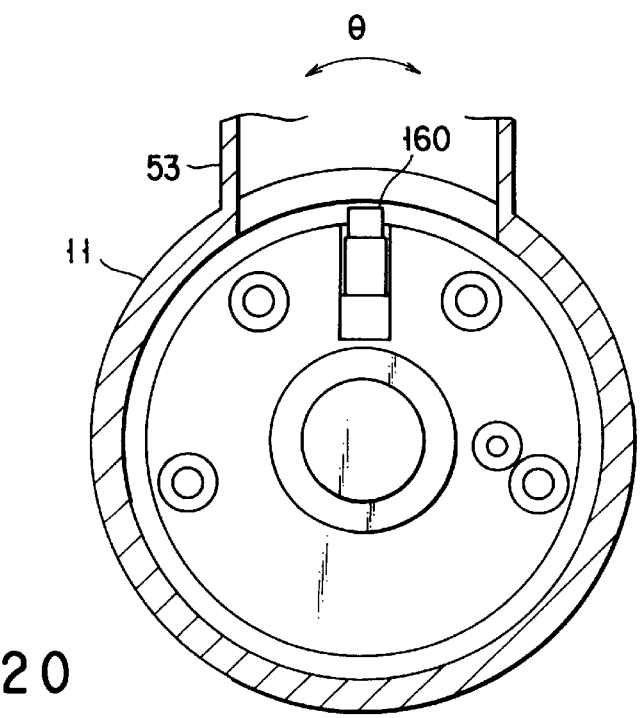
FIG. 20 is a view showing a layout of a branch pipe detection sensor in a sixth embodiment.

A T-shaped pipe welding/cutting device 164 according to this embodiment has a welding/cutting cart denoted at 166 in FIG. 19. The welding/cutting cart 166 has a branch pipe distance sensor denoted at 165 in FIG. 19, in addition to the branch pipe detect sensors 160 of the fourth embodiment shown in FIG. 15. This branch pipe distance sensor 165 is installed on a circumferential surface opposite to the position where the nozzle 120 of the head 107 is provided, and this sensor 165 has a function of measuring a distance between the head 107 and the inner wall of a branch pipe 53.

Operation of a T-shaped pipe welding/cutting device thus constructed will be explained below.

At first, the head 107 is inserted into the branch pipe 53 in accordance with the same procedure as that in the fourth embodiment, and thereafter, a branch pipe distance sensor 65 is positioned so as to face in the axis direction of the pipe 11 (or so as to face the inner wall of the branch pipe 53) by the ρ-axis movement mechanism. In this state, the distance to the inner wall of the branch pipe 53 is measured. Subsequently, the ρ-axis is rotated by 180°, and the distance between the branch pipe distance sensor 165 and the inner wall of the branch pipe 53 is measured in a similar manner.

Further, the Z-axis is moved in the direction in which a deviation amount between the results of the two distance measurements is reduced by half. Subsequently, the ρ-axis is rotated by 90°, and the distance to the inner wall of the branch pipe 53 is measured by the branch pipe distance sensor 165. Thereafter, the ρ-axis is rotated by 180°, and the distance to the inner wall of the branch pipe 53 is measured with use of the branch pipe distance sensor 165. The positioning of the head 107 can be corrected to comply with the center of the branch pipe 53, by rotating the θ-axis such that the results of these two distance measurements are equalized.

When welding is carried out, measurement results of the branch pipe distance sensor 165 are changed by moving the head 107 in the R-axis direction before a branch pipe 167 to be installed is positioned at a welding position, as shown in FIG. 19. As a result of this, the position of an opening can be detected.

According to the structure as described above, the distance between the inner wall of a branch pipe 53 and the head 107 is measured with use of a branch pipe distance sensor 165, and a positioning correction is made such that the center axis of the head 107 complies with the center axis of the branch pipe 53. Therefore, when ρ-axis rotation is carried out, the distance between the inner wall of a branch pipe 53 and the laser beam injection hole 106 can be maintained to be constant with improved accuracy.

(Sixth Embodiment)

In the next, a sixth embodiment of a T-shaped pipe welding/cutting device according to the present invention will be explained below.

The sixth embodiment teaches an example in which θ-axis rotation is simultaneously carried out when a T-shaped pipe welding/cutting device having the branch pipe detect sensors 160 moves in the pipe axis direction in a pipe 11.

According to a driving method as described above, the trace of each branch pipe detect sensor 160 extends like a spiral. Therefore, the number of branch pipe detect sensors can be reduced to one by adjusting the moving speed in the axis direction of the pipe 11 and the θ-axis rotation speed.

In this case, if each branch pipe detect sensor 160 is rotated in the θ-direction by one turn while the T-shaped pipe welding/cutting device moves by a distance equal to the pipe diameter of a branch pipe 53, the sensor 160 does not fail to detect the branch pipe. This method is effective when the T-shaped pipe welding/cutting device has a small space for installing branch pipe detect sensors 160.

(Seventh Embodiment)

Figure 21:
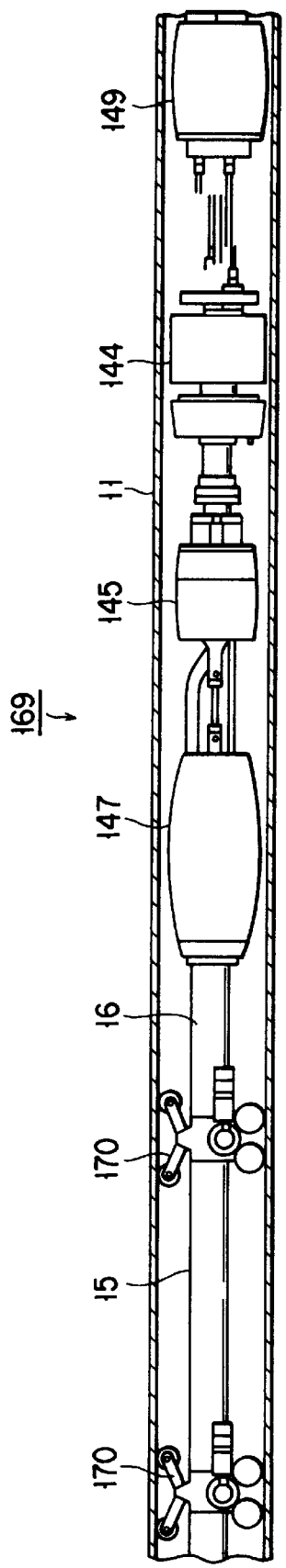
FIG. 21 is a view schematically showing a structure of a seventh embodiment.

The seventh embodiment is constructed by providing a movement mechanism 170 shown in FIG. 21, in place of the movement device 12 (including movement mechanisms 20a and 20b) of the first embodiment.

Figure 22:
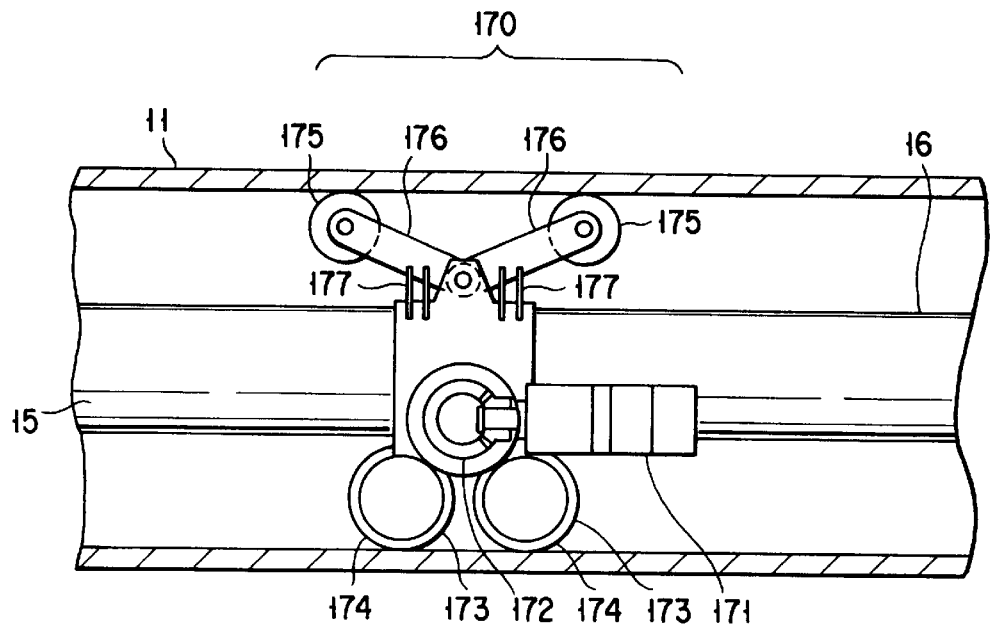
FIG. 22 is a view specifically showing a structure of a movement mechanism.

FIG. 22 shows an enlarged view of the movement mechanism 170.

The drive system of the movement mechanism 170 comprises an in-pipe movement motor 171, an in-pipe movement bevel gear 172, an in-pipe movement spur gear 173, and an in-pipe movement pinch roller 174. The movement mechanism 170 has a guide pinch roller 175 in the side opposite to the in-pipe movement pinch roller 174. The guide pinch roller 175 is arranged such that this roller is pressed against the inner wall surface of the pipe 11 by means of a combination of an arm 176 and a spring 177, thereby generating a reaction force by which the in-pipe movement pinch roller 174 is pressed against the wall surface of the pipe 11, to obtain a friction force for generating a thrust force.

According to the structure as described above, the device is capable of moving by itself like in the first embodiment, so that the device can excellently move in a pipe 11 having a complicated shape.

(Eighth Embodiment)

The eighth embodiment is arranged such that position data concerning a branch pipe 53 as a target to be processed is stored in a control board 19 for controlling a T-shaped pipe welding/cutting device, on the basis of layout data concerning the branch pipe previously obtained from design construction references and the like, so that only a predetermined branch pipe 53 is processed.

Specifically, the control board 19 determines whether or not a branch pipe 53 detected by a branch pipe detect sensor 60 is the branch pipe 53 as a target to be processed, by comparing in-pipe movement distance data sent from the T-shaped pipe welding/cutting device with the layout data concerning the branch pipe 53, on occasion. In this manner, even when a number of branch pipes 53 are provided on a pipe 11, a head 107 can be positioned with respect to only one of the branch pipes 53 which includes a portion to be processed.

According to the structure as described above, it is possible to prevent the device from stopping at a branch pipe 53 which is not to be processed. In addition, even when a pipe has a coupler or a damage and a branch pipe detect sensor erroneously detects such a coupler or a damage as a branch pipe, the device can be prevented from stopping.

(Ninth Embodiment)

The ninth embodiment is constructed by providing a pipe 11 with a conical guide surface 179 and by providing the head 107 of the welding/cutting device with a profile portion 180 which is engaged with the guide surface 179, a jack mechanism 181 for pressing the profile portion 180 against the guide surface 179, and a return spring 182 for receiving a reaction force from the head 107.

The guide surface 179 is formed such that the center axis of the head 107 can be automatically aligned with the center axis of a branch pipe 53 only by engaging the profile portion 180 with the guide surface 179.

Operation of the T-shaped pipe welding/cutting device 178 thus constructed will be explained below.

The T-shaped pipe welding/cutting device 178 according to this embodiment moves in a pipe 11 and is then positioned in the vicinity of a branch pipe 53 having a portion to be processed. Thereafter, the device 178 expands the jack mechanism 181 to press the profile portion 180 against a guide 179 provided in the pipe 11.

Since both of the guide 179 and the profile portion 180 have conical shapes which can be engaged with each other, the guide 179 and the profile portion 180 are automatically aligned with each other when being pressed against each other.

Figure 23:
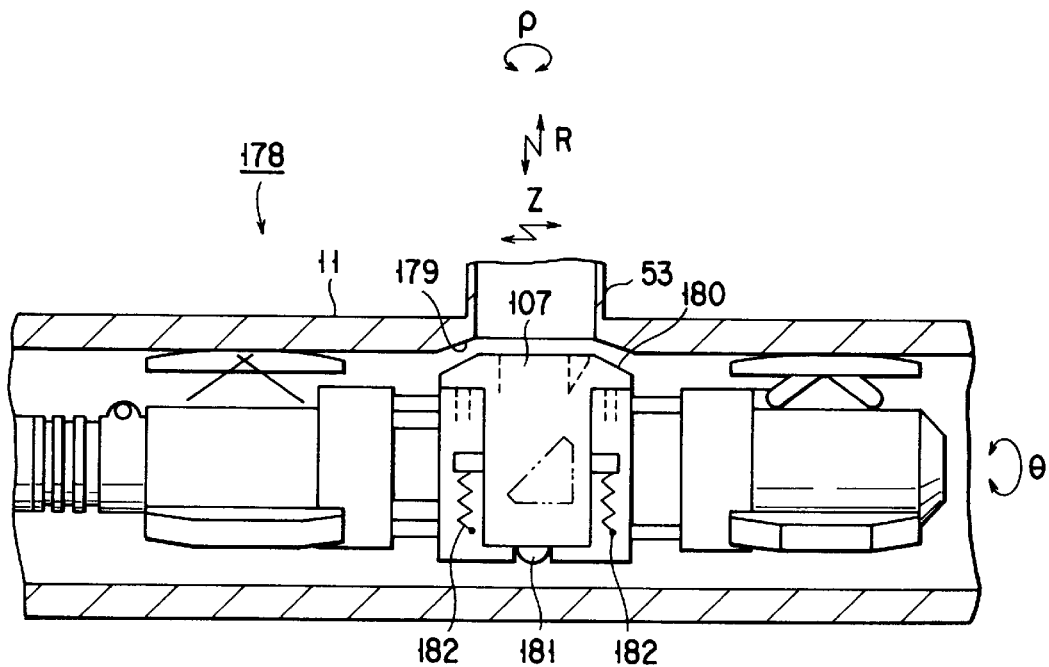
FIG. 23 is a view schematically showing a structure according to an eighth embodiment.

In a state in which the centers of the guide 179 and the profile portion 180 are aligned with each other, the head 107 is inserted into the branch pipe 53 by a R-axis movement mechanism, as shown in FIGS. 24 and 25. Note that the profile portion 180 moves back due to an action of the return spring 182 and recovers a state shown in FIG. 23, when the jack mechanism 181 is contracted.

According to the structure as described above, the head 107 can be easily and stably aligned with the center axis of the branch pipe 53 by engaging the guide surface 179 with the profile portion 180, so that the distance between the inner wall of a branch pipe 53 and the laser beam injection hole 106 can be maintained to be constant when carrying out ρ-axis rotation.

(Tenth Embodiment)

Figure 26:
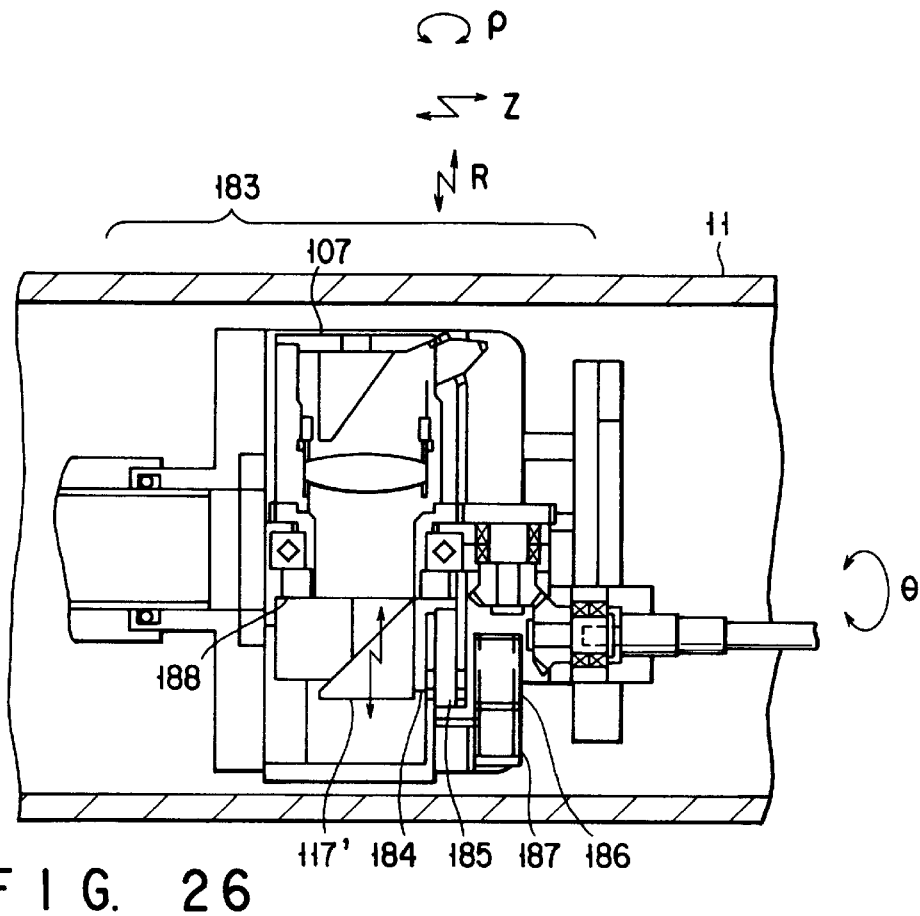
FIG. 26 is a view showing a cross-section of a structure of a welding/cutting cart according to a tenth embodiment.

The tenth embodiment is constructed by arranging the welding/cutting cart 144 of the third embodiment, such that the first mirror 117' is movable in the R-axis direction, as shown in FIG. 26. Specifically, the first mirror 17' is installed on a case 186 by a mirror case 184 and a shaft 185. The case 186 is equipped with a spring 187 and is therefore constructed to be elastically slidable in the R-axis direction.

The first mirror 117' is energized by the spring 187 and is thereby positioned at a regular YAG laser reflection position, when the head 107 is projected from the body 108 and is positioned in the branch pipe 53. Therefore, processing can be performed on the branch pipe 53.

Meanwhile, when the head 107 is contained in the body 108, a ρ-axis bearing stopper 188 has a contact with a mirror case 184 and drives this mirror case. As a result, the first mirror 117' moves from a regular YAG laser reflection position. Since the first mirror 117' thus moves, a long movement stroke can be obtained for the R-axis drive system.

(Eleventh Embodiment)

Figure 27:
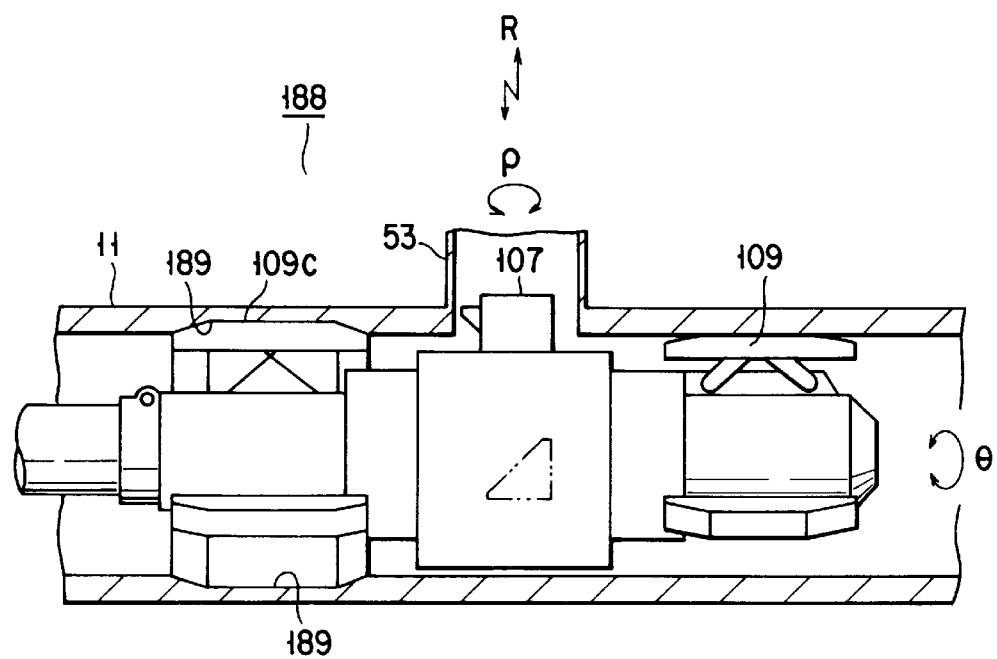
FIG. 27 is a view schematically showing a structure of an eleventh embodiment.
Figure 28:
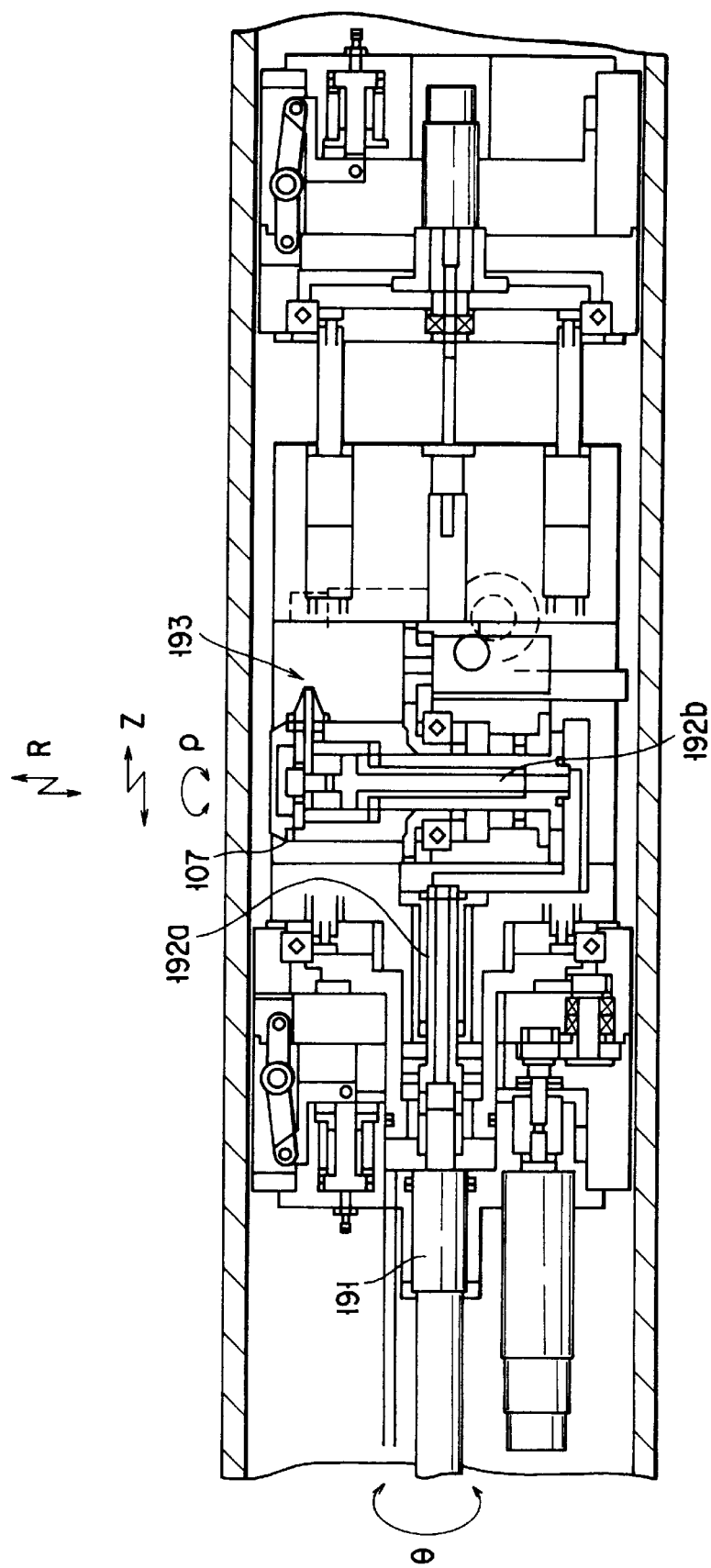
FIG. 28 is a view schematically showing a structure of a twelfth embodiment.

A T-shaped pipe welding/cutting device 188 of the eleventh embodiment is constructed such that one centering mechanism 109c of the second embodiment (in FIG. 9) can be engaged with a ring-like guide 189 by providing a ring-like guide surface 189 on the inner surface of a pipe 11, as shown in FIG. 27.

According to this structure, the head 107 can be aligned with the center axis of a branch pipe 53, only by engaging the centering mechanism 109c with the ring-like guide 189.

Therefore, according to this embodiment, the head 107 can be positioned and inserted in a branch pipe 53, with only one variance of movements of the θ-axis rotation mechanism in the circumferential direction even if the Z-axis movement mechanism covering movements in the axis direction of the pipe 11.

(Twelfth Embodiment)

The twelfth embodiment is constructed by arranging a T-shaped pipe welding/cutting device 164 as shown in FIG. 19, such that the distance between the inner wall of a branch pipe and the branch pipe distance sensor 165 is measured by the branch pipe distance sensor 165 when rotating the head 107 around the ρ-axis.

Movement amounts in the R-axis, Z-axis, and θ-axis are calculated by a calculation circuit provided in a control board 19, such that the measurement values described above are constant, and the calculation results are used as command values to perform positioning control by means of a servo circuit. Accordingly, the distance between the nozzle 120 and the inner wall of the branch pipe 11 can be maintained to be constant.

Specifically, as shown in FIG. 19, positioning control can be performed with the distance to the branch pipe 53 kept constant, by only one axis of the Z-axis, when the branch pipe distance sensor 165 faces in the axis direction of a pipe 11. However, if the head 107 is rotated in the ρ-direction, it is necessary to make a position correction in the θ-axis direction. Further, a displacement in the R-axis direction caused by a movement of the θ-axis. According to the present embodiment, movement amounts of the R-axis, Z-axis, and θ-axis can be calculated only from the rotation angle of the ρ-axis and measurement results from the branch pipe distance sensor 165.

(Thirteenth Embodiment)

The thirteenth embodiment is constructed by arranging the structure of the T-shaped pipe welding/cutting device according to the second embodiment shown in FIG. 10, such that the YAG laser transfer fiber 114 is replaced with a welding current cable 191, the optical components of lenses and mirrors are replaced with slip rings 192a and 192b, and the laser injection hole is replaced with a tungsten electrode 193.

Figure 29:
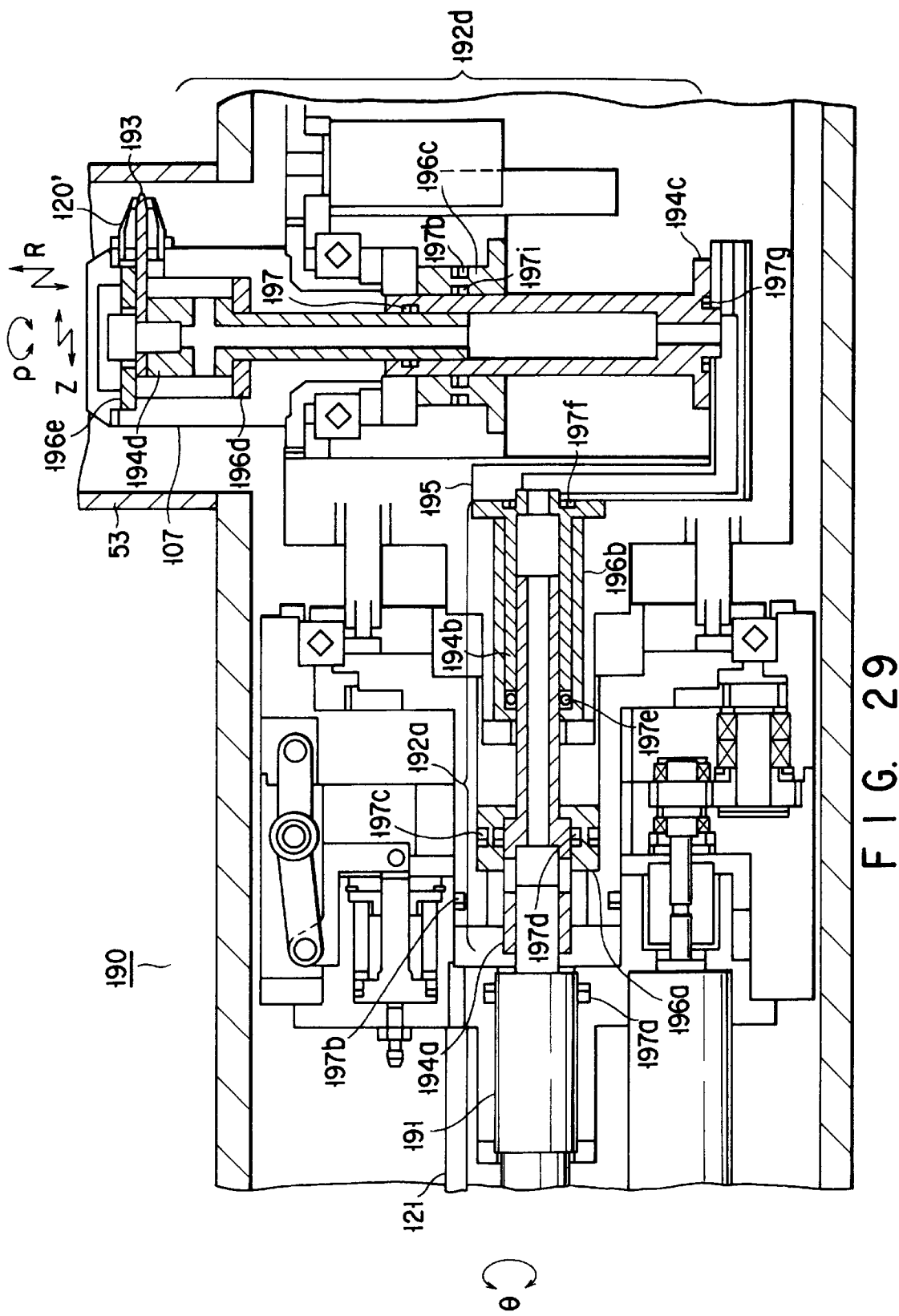
FIG. 29 is a view schematically showing a structure of a thirteenth embodiment.

FIG. 29 specifically shows a characterizing portion of the structure of this embodiment. Explanation will be made to the welding current and supply of a shield gas when welding is carried out, with reference to the figure.

A welding current transferred through a welding current cable 191 flows through a slip ring 192a consisting of electrodes 194a and 194b, to a conductive plate 195, and is transmitted to a slip ring 192b consisting of electrodes 194c and 194d. This current is then supplied to a tungsten electrode 193 installed on a nozzle 120'.

Further, the slip ring 192a has a structure in which a current is transferred by a slide action between the electrodes 194a and 194b when θ-axis rotation and Z-axis movement are carried out. The slip ring 192b has a structure in which a current is transferred by a slide action between the electrodes 194c and 194d when ρ-axis rotation and R-axis movement are carried out.

The slip rings 192a and 192b are supported by insulating plates 196a to 196e, so that a welding current does not flow out to other portions. A shield gas supplied by a gas tube 121 during welding passes through the slip rings 192a and 192b and the conductive plate 195, and supplied to the head 107 from which the gas is injected from the nozzle 120'.

In addition, O-rings 197a to 197j are provided to shield the gas. In this embodiment, the slip rings 192a and 192b are cooled by the shield gas.

According to the present embodiment, welding on the inner wall of a branch pipe can be carried out by TIG welding generally used. In this embodiment, the welding bead can be widened in comparison with YAG welding, welding can be carried out if the positioning accuracy of the nozzle 120' is low.

(Fourteenth Embodiment)

This embodiment is constructed by arranging the T-shaped pipe welding/cutting device 143 of the thirteenth embodiment shown in FIG. 12, such that an actuator using a fluid force, such as an air-cylinder or a hydraulic motor, is used as a driving source for each axis. A direction control valve or a servo valve and an actuator are mounted on a separate cart, and are driven by a connection with use of tubes.

According to the present embodiment, a drive force can be easily transmitted between separate carts with use of a fluid force.

The present invention is not limited to the embodiments described above, but can be variously modified without changing the subject matter of the invention.

For example, although the in-pipe work device according to the second embodiment is of a self-moving type which moves by itself, the present invention is not limited hitherto. The T-shaped pipe welding/cutting device 105 may hang from a winding drum 11 by a connection cable, and the pipe welding/cutting device 105 may be moved in a pipe by driving the winding drum 11.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An in-pipe work device comprising:
   at least two movement mechanisms connected with each other in a longitudinal direction of a pipe by a flexible tube, and a control device for controlling the movement mechanisms, the movement mechanisms including:
      a body connected to the flexible tube;
      a guide member installed on the body such that the guide member is slidable in an axial direction;
      a support leg drive mechanism provided on the guide member and having a support leg movable in a radial direction of the pipe, for pressing the support leg against an inner wall of the pipe, thereby to hold the guide member kept unmovable in an axis direction of the pipe;
      a slide mechanism for relatively sliding the guide member and the body, with the support leg pressed against the inner wall of the pipe, thereby to slide the body in the axis direction of the pipe,
   wherein the control device controls the in-pipe movement device so as to move in a pipe by itself, by sequentially operating the movement mechanisms in a predetermined order,
   wherein the support leg drive mechanism includes:
      a slider provided on the guide member such that the slider is slidable in the longitudinal direction of the pipe;
      a roller provided on the support leg and having a contact with a tapered surface of the slider; and
      a slider drive means for driving the slider in a direction toward a top of the pipe, thereby to drive outwardly the support leg in the radial direction of the pipe by means of the roller.

2. An in-pipe work apparatus according to claim 1, wherein the flexible tube contains control cables for connecting the movement mechanisms with the control device.

3. An in-pipe work device comprising:
   at least two movement mechanisms connected with each other in a longitudinal direction of a pipe by a flexible tube, and a control device for controlling the movement mechanisms, the movement mechanisms including:
      a body connected to the flexible tube;
      a guide member installed on the body such that the guide member is slidable in an axial direction;
      a support leg drive mechanism provided on the guide member and having a support leg movable in a radial direction of the pipe, for pressing the support leg against an inner wall of the pipe, thereby to hold the guide member kept unmovable in an axis direction of the pipe;

a slide mechanism for relatively sliding the guide member and the body, with the support leg pressed against the inner wall of the pipe, thereby to slide the body in the axis direction of the pipe, wherein the control device controls the in-pipe movement device so as to move in a pipe by itself, by sequentially operating the plurality of movement mechanism in a predetermined order, wherein the guide member is provided with a cylindrical slide guide such that the cylindrical slide guide contains the body, the guide member, the support leg drive mechanism, and the slide mechanism and has an outer circumferential surface which is slidable on an inner surface of the pipe, and wherein the support leg is provided such that the support leg can be projected outwardly from a part of the slide guide, wherein the support leg has a curved contact surface and the contact surface can be contracted in a plane equal to the outer circumferential surface of the slide guide.

4. An in-pipe work device comprising:

at least two movement mechanisms connected with each other in a longitudinal direction of a pipe by a flexible tube, and a control device for controlling the movement mechanisms, the movement mechanisms including:

a body connected to the flexible tube;

a guide member installed on the body such that the guide member is slidable in an axial direction;

a support leg drive mechanism provided on the guide member and having a support leg movable in a radial direction of the pipe, for pressing the support leg against an inner wall of the pipe, thereby to hold the guide member kept unmovable in an axis direction of the pipe;

a slide mechanism for relatively sliding the guide member and the body, with the support leg pressed against the inner wall of the pipe, thereby to slide the body in the axis direction of the pipe, wherein the control device controls the in-pipe movement device so as to move in a pipe by itself, by sequentially operating the movement mechanisms in a predetermined order, wherein said slide mechanism is a ball screw mechanism.

5. An in-pipe work apparatus according to claim 4, wherein the ball screw includes:

a motor provided on the guide member;

a screw shaft connected to the motor; and a nut portion fixed to an end of the body and screwed on the screw shaft.

* * * * *